United States Patent

Matsuura et al.

[11] Patent Number: 6,163,912
[45] Date of Patent: Dec. 26, 2000

[54] WASHING MACHINE

[75] Inventors: Sadahiro Matsuura, Ibaraki; Shigeru Satou, Katano; Toru Tazawa, Ibaraki; Katsuyuki Nagai, Sennan; Yoshiaki Igarashi, Ikoma, all of Japan

[73] Assignee: Matsushita Electric Industrial Co., Ltd., Osaka-Fu, Japan

[21] Appl. No.: 09/139,339

[22] Filed: Aug. 24, 1998

[30] Foreign Application Priority Data

Sep. 22, 1997 [JP] Japan .................................. 9-257296
May 20, 1998 [JP] Japan .................................. 10-139022

[51] Int. Cl.[7] .................................................. D06F 33/04
[52] U.S. Cl. .............................................. 8/159; 68/12.16
[58] Field of Search .............................. 68/12.02, 13 R, 68/12.06, 12.16; 318/807, 808, 809; 8/158, 159

[56] References Cited

U.S. PATENT DOCUMENTS

| | | |
|---|---|---|
| 2,935,674 | 5/1960 | Hohne, Jr. . |
| 3,152,462 | 10/1964 | Elliott et al. . |
| 3,248,908 | 5/1966 | Pope . |
| 4,292,559 | 9/1981 | Auinger et al. . |
| 4,749,933 | 6/1988 | Ben-Aaron . |
| 4,986,092 | 1/1991 | Sood et al. . |
| 5,146,146 | 9/1992 | Samann . |
| 5,677,606 | 10/1997 | Otake ...................................... 318/434 |
| 5,701,066 | 12/1997 | Matsuura et al. ....................... 318/808 |
| 5,734,250 | 3/1998 | Lindmark . |

FOREIGN PATENT DOCUMENTS 4-126192  4/1992  Japan .

*Primary Examiner*—Frankie L. Stinson
*Attorney, Agent, or Firm*—Sheridan Ross P.C.

[57] ABSTRACT

A torque current component and an exciting current component of primary AC currents which are supplied to a stator of a three-phase induction motor are commanded independently of each other in accordance with a command rotational angular velocity and a rotational angular velocity of the three-phase induction motor rotating an agitator, and the rotational angular velocity of the three-phase induction motor is controlled by changing the magnitude and frequency of each of the primary AC currents. Furthermore, a test operation is carried out by giving the command angular velocity so as to make constant the angular velocity of the motor, and the laundry amount is estimated corresponding to an output torque of the motor in the test operation.

48 Claims, 21 Drawing Sheets

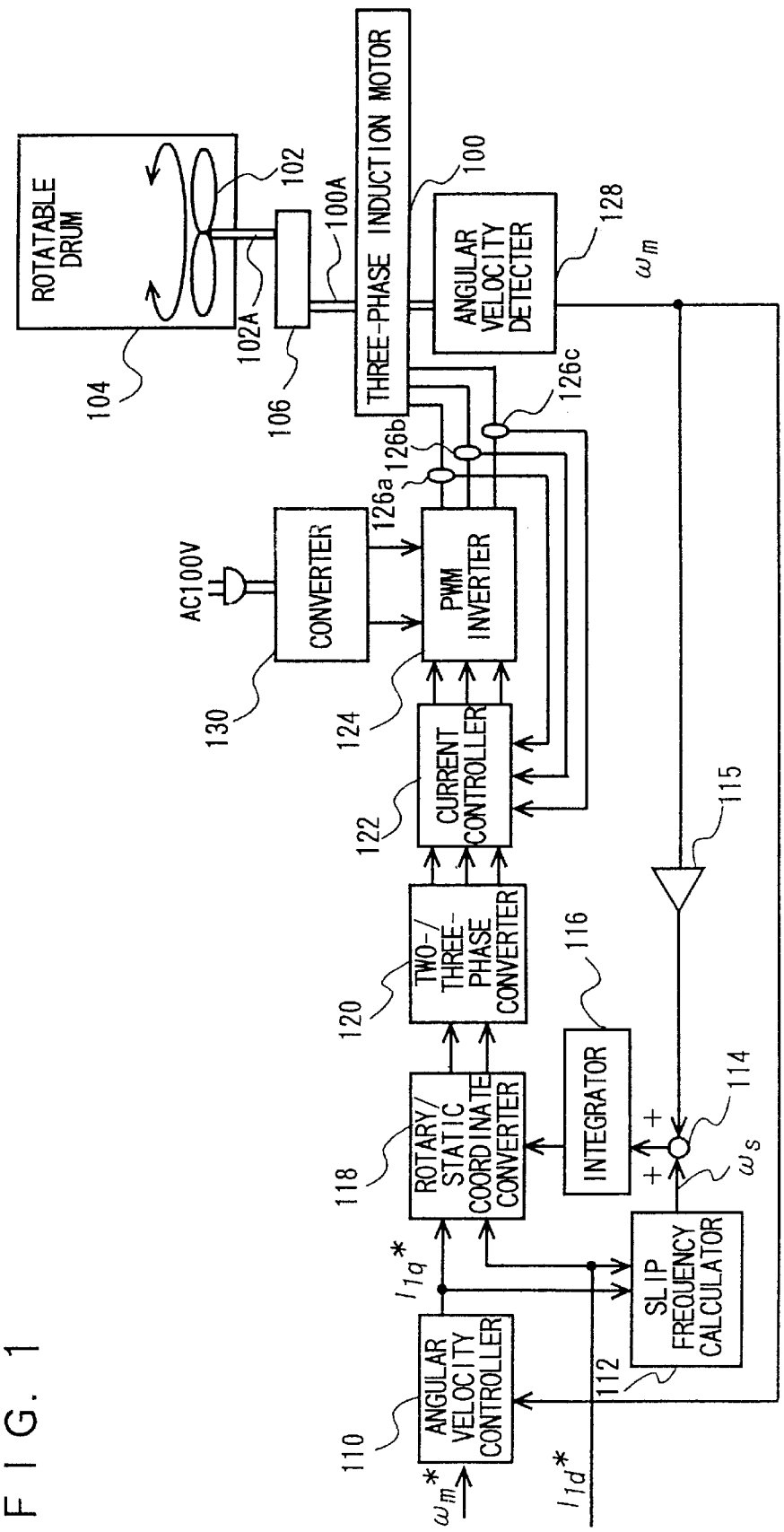
F I G. 1

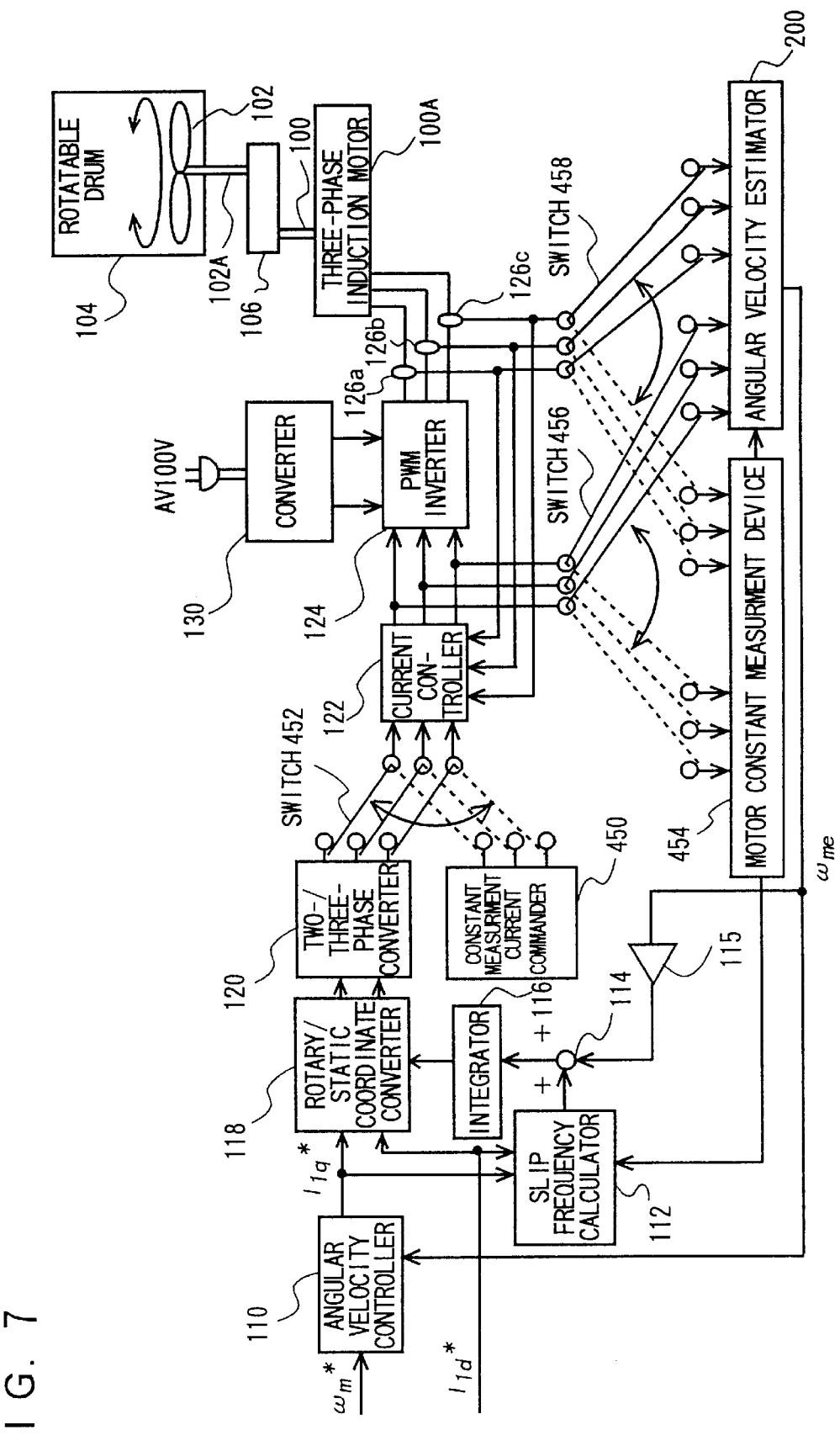
F I G. 7

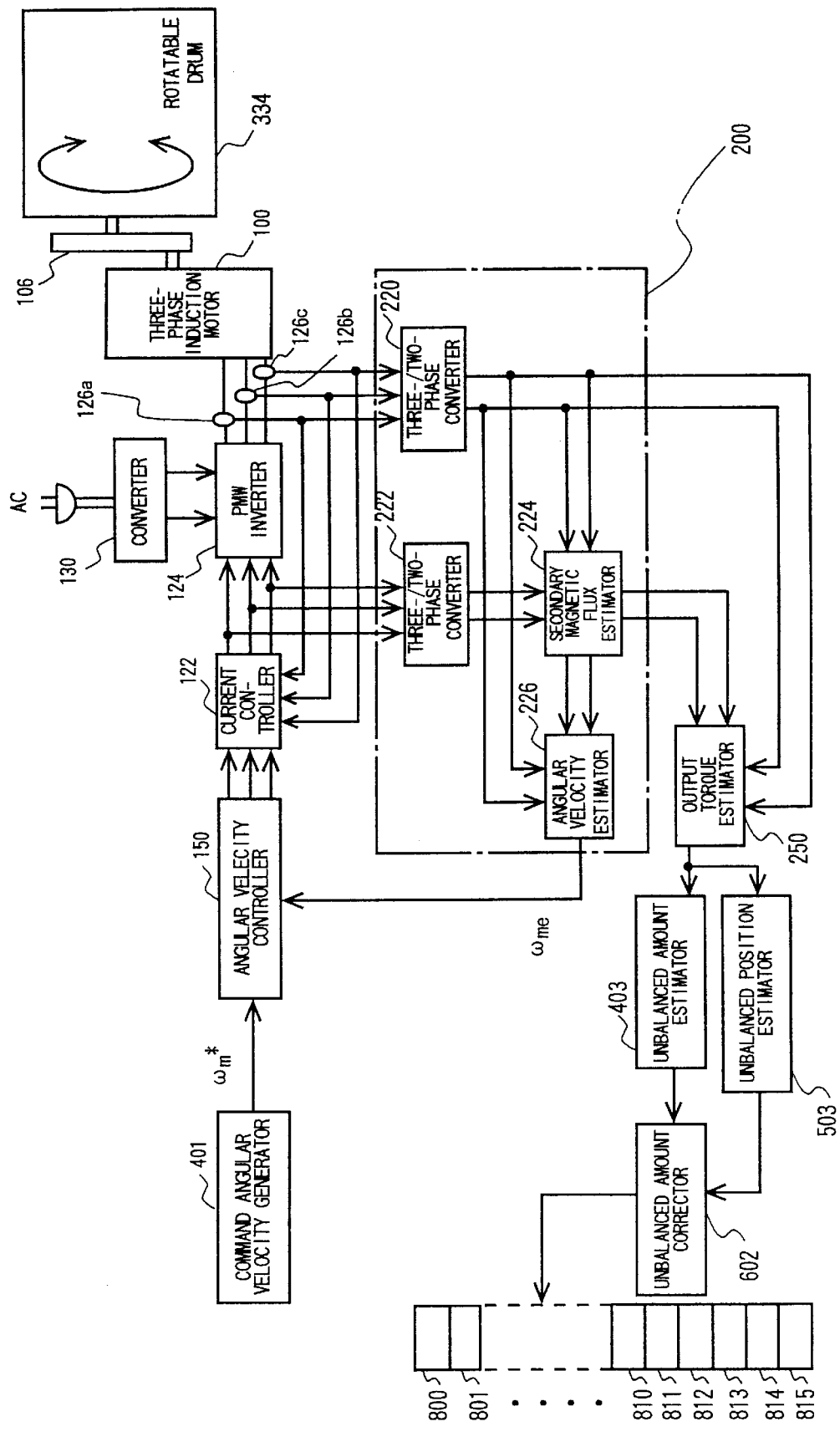
F I G. 21

WASHING MACHINE

BACKGROUND OF THE INVENTION

The present invention relates to a washing machine using a three-phase induction motor, or more in particular to a washing machine estimating the amount of laundry and detecting an unbalanced amount caused by uneven distribution of laundry in a rotatable drum.

The motor for driving the agitator of the conventional washing machine is a single-phase induction motor in most cases. The single-phase induction motor drives the agitator by rotating at a constant rotational angular velocity determined by the power frequency and the reduction ratio of the reduction gear such as gears and belt. The single-phase induction motor has so small a torque in the range of low speeds that the amount of laundry that can be washed at a time and the washing system are limited.

As a means for solving this problem, JP-A-7-255988 proposes a method for varying the rotational speed of the agitator using a DC brushless motor and an invertor circuit.

On the other hand, JP-A-6-351292 proposes a method for varying the rotational speed of a three-phase induction motor by V/f control using an invertor circuit.

A conventional washing machine estimating the amount of laundry in the rotatable drum is disclosed, for example, in JP-A-61-8094. In this prior art, the motor for driving the rotatable drum stops being driven at the time point when the rotational speed of the motor reaches a predetermined level wherein the amount of laundry is estimated based on the time from deenergization to of the motor to subsequent stop of the motor under rotation with inertia. On the other hand, JP-A-6-71085 proposes a method in which the voltage applied to the motor is maintained constant and the amount of laundry is estimated from the change in angular velocity information detected by an angular velocity sensor mounted on the motor. Further, JP-A-5-3990 discloses a method of estimating the amount of laundry from the current supplied to the motor.

In a conventional washing machine disclosed in JP-A-3-70596 which detects an unbalanced amount due to the uneven distribution of laundry in the rotatable drum, a sensor for detecting the vibrations is mounted in the rotatable drum to detect an unbalance. Also, JP-A-5-103895 discloses a method for detecting an unbalanced state from the angular velocity information detected by an angular velocity sensor mounted on the motor. Further, JP-A-9-290089 discloses a method using a position sensor for detecting an unbalanced state of the rotatable drum and measuring the position of unevenly distributed laundry in the rotatable drum from the variations in the current flowing in the motor.

The conventional method using a DC brushless motor has encountered a problem of high cost of the DC brushless motor in comparison with an induction motor.

In the conventional method of controlling the angular velocity of a three-phase induction motor by invertor, a constant ratio V/f between the applied voltage and frequency of the motor must be maintained. However, the controllability of the three-phase induction motor is inferior to that of the DC motor. Especially, it is not easy to produce a large torque in low-speed ranges. Therefore the problem is that a large amount of laundry cannot be easily washed at a time.

The method of estimating the amount of laundry such as the weight from the time during which the drive motor rotates under inertia has a low accuracy. Also, the method of estimating the amount of laundry based on the rotational angular velocity of the motor requires mounting of an angular velocity sensor on the motor.

The above-mentioned methods of estimating the amount such as the weight of laundry in the rotatable drum has the problem of a low estimation accuracy, regardless of whether the amount of laundry is estimated from the change in the rotational angular velocity of the motor under a predetermined voltage applied thereto, or from the current supplied to the motor.

The method for detecting the unbalanced amount in the rotatable drum, requires mounting of a sensor for detecting vibrations. On the other hand, detection of an unbalanced amount accurately from the change in rotational angular velocity requires a highly accurate angular velocity sensor, and therefore is expensive. Further, the method of detecting an unbalanced amount from the variations in the current supplied to an induction motor, poses the problem of a low detection accuracy.

BRIEF SUMMARY OF THE INVENTION

An object of the present invention is to provide a washing machine capable of washing a large amount of laundry at low cost, using a three-phase induction motor driven by invertor to attain a performance equivalent to a DC brushless motor.

Another object of the invention is to provide a washing machine capable of estimating the amount of laundry accurately without using any velocity sensor.

Still another object of the invention is to provide a washing machine, or especially a washing machine of drum type, which is capable of estimating the amount of laundry in the rotatable drum accurately and detecting an unbalanced amount due to an uneven distribution of laundry in the rotatable drum accurately.

According to an aspect of the invention, there is provided a washing machine comprising a rotatable drum for washing and dewatering the laundry, a three-phase induction motor for rotating an agitator mounted in the rotatable drum, and an angular velocity estimator for estimating the rotational angular velocity from the value of at least one of the primary AC current and the primary AC voltage which are supplied to the stator of the three-phase induction motor, and from constants unique to the three-phase induction motor. In accordance with the command rotational angular velocity of the three-phase induction motor and the output value of the angular velocity estimator, the torque current component and the exciting current component of the primary AC current of each phase supplied to the stator of the three-phase induction motor are commanded independently of each other. Consequently, the magnitude and frequency of the primary AC current of each phase is changed to control the rotational angular velocity of the three-phase induction motor.

According to another aspect of the invention, there is provided a washing machine further comprising a test operation means for determining, as the above-mentioned torque current component, the product of the difference between the command rotational angular velocity of the three-phase induction motor and the output value of the angular velocity estimator by a predetermined test operation constant. A test operation is conducted by supplying the same product as a command value to the three-phase induction motor. A laundry amount estimation means is included for estimating the amount of laundry in accordance with the output of the angular velocity estimator during the test operation.

According to still another aspect of the invention, there is provided a washing machine comprising a motor for driving a rotatable drum, and a controller for controlling the rotational angular velocity of the motor. It further comprises a test operation controller for conducting a test operation of the motor by applying such a command angular velocity as to maintain a constant rotational angular velocity of the motor, and a laundry amount estimator for estimating the amount of laundry based on the output torque of the motor during the test operation.

In the case where the motor is driven in response to such a command angular velocity as to maintain a constant rotational angular velocity, the output torque of the motor changes in accordance with the load. Under a heavy load, for example, the output torque increases. It is therefore possible to estimate the amount of laundry in the rotatable drum on the basis of the output torque.

According to still another aspect of the invention, there is provided a washing machine comprising a motor for driving a rotatable drum, a controller for controlling the rotational angular velocity of the motor, a test operation controller for conducting a test operation by rotating the motor at a predetermined constant rotational angular velocity. It further comprises an unbalanced amount estimator for estimating the unbalanced amount in the rotatable drum due to an uneven distribution of laundry attached to the inner wall of the rotatable drum based on the output torque of the motor during the test operation.

The motor is rotated at a predetermined rotational angular velocity and thus rotating the rotatable drum at a predetermined constant rotational angular velocity while the laundry is unevenly distributed in the rotatable drum. Consequently, the output torque of the motor undergoes variations in synchronism with the rotation. By determining the amount of variations of the output torque, therefore, the unbalanced amount of the rotatable drum can be estimated.

According to still another aspect of the invention, there is provided a washing machine comprising an angular velocity estimator for estimating the rotational angular velocity of a three-phase induction motor for driving a rotatable drum or an agitator mounted in the rotatable drum based on at least one of the primary AC current value and the primary AC voltage value supplied to the stator of the three-phase induction motor, and based on constants unique to the three-phase induction motor. The angular velocity is estimated in accordance with the command rotational angular velocity of the three-phase induction motor and the output value of the angular velocity estimator. Based on the estimated angular velocity value, the torque current component and the exciting current component of the primary AC currents supplied to the stator of the three-phase induction motor are commanded independently of each other. Consequently, the rotational angular velocity of the three-phase induction motor is controlled by changing the magnitude and frequency of each of the primary AC currents, thereby realizing an inexpensive, high-performance washing machine.

According to still another aspect of the invention, there is provided a washing machine further comprising a test operation controller for conducting a test operation of the three-phase induction motor in response to a command representing the above-mentioned torque current component given as the product of the difference between the command rotational angular velocity of the three-phase induction motor and the output of the angular velocity estimator by a predetermined test operation constant. It further comprises a laundry amount estimator, and the amount of laundry is estimated in accordance with the output of the angular velocity estimator during the test operation, thereby making it possible to realize a washing machine capable of estimating the laundry amount accurately.

According to still another aspect of the invention, there is provided a washing machine comprising a motor for driving a rotatable drum, a controller for controlling the rotational angular velocity of the motor, a test operation controller for conducting a test operation of the motor in response to a command angular velocity associated with a constant angular acceleration of the motor. A laundry amount estimator is included for estimating the amount of laundry in accordance with the output torque of the motor during the test operation, thereby realizing a washing machine capable of estimating the laundry amount easily and accurately.

According to still another aspect of the invention, there is provided a washing machine comprising a motor for driving a rotatable drum, a controller for controlling the rotational angular velocity of the motor, a test operation controller for conducting a test operation so as to attain a predetermined constant rotational angular velocity of the motor. An unbalanced amount estimator is included for estimating the unbalanced amount due to an uneven distribution of laundry closely attached to the rotatable drum in accordance with the output torque of the motor in the test operation, thereby realizing a washing machine capable of estimating the unbalanced amount of the rotatable drum accurately.

BRIEF DESCRIPTION OF THE SEVERAL VIEWS OF THE DRAWING

FIG. 1 is a block diagram showing a configuration of a washing machine according to a first embodiment of the invention.

FIG. 7 is a block diagram showing a configuration of a washing machine according to a sixth embodiment of the invention.

FIG. 21 is a block diagram showing a configuration of a washing machine according to the 13th embodiment of the invention.

DETAILED DESCRIPTION OF THE INVENTION

Figure 2:
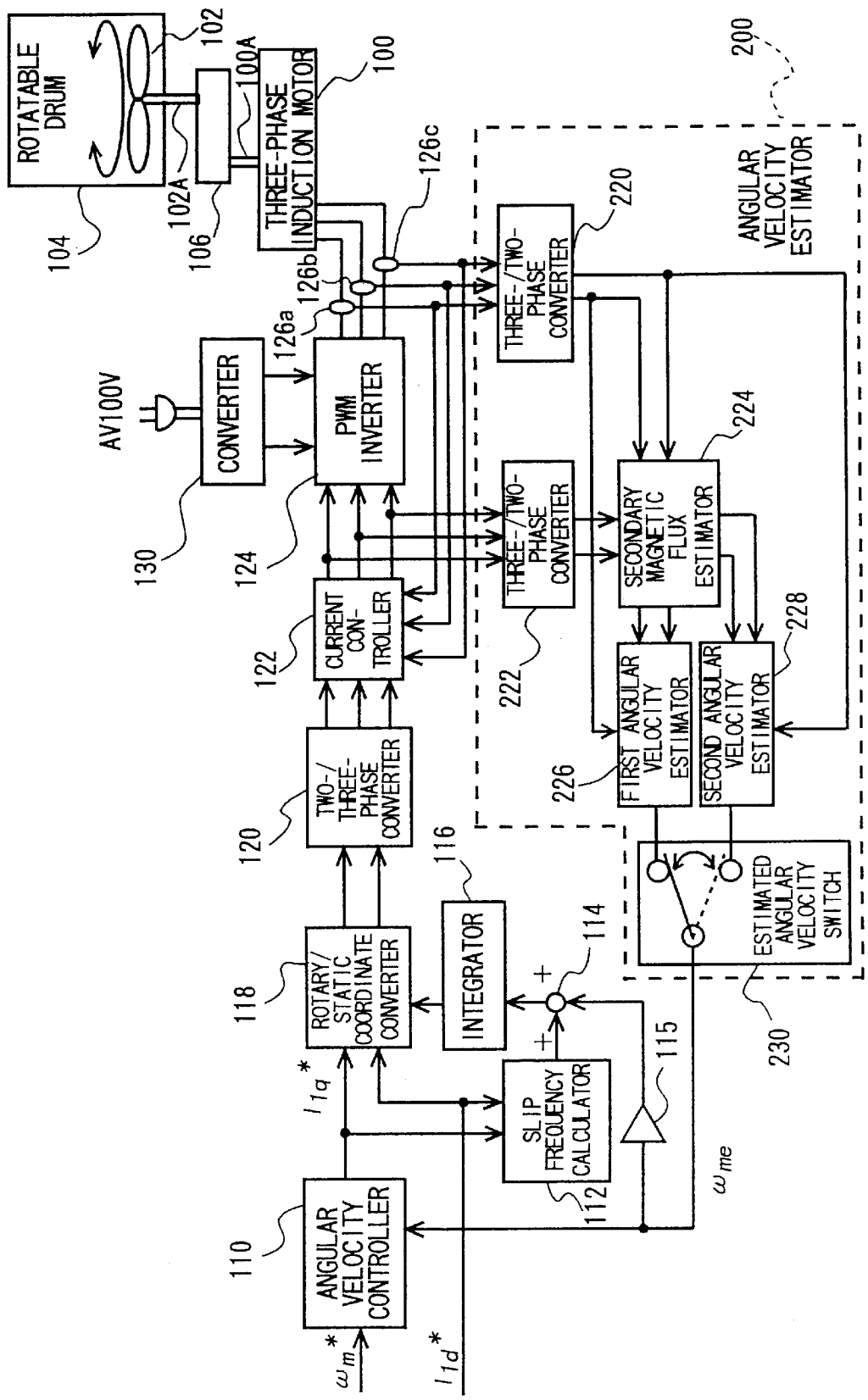
FIG. 2 is a block diagram showing a configuration of a washing machine according to a second embodiment of the invention.

Preferred embodiments of the invention will be explained below with reference to FIG. 1 to FIG. 21. Hereinafter, the mark * on the right shoulder of each symbol indicating the current shows that the symbol involved is a command. A symbol of a physical amount lacking the mark *, on the other hand, indicates an actual value. A physical amount with a suffix "e" indicates an estimated value.

First Embodiment

FIG. 1 is a block diagram showing a configuration of a washing machine according to a first embodiment of the invention.

In FIG. 1, the rotary shaft 110A of a three-phase induction motor 100 is coupled to the rotary shaft 102A of agitator 102 arranged in a rotatable drum 104 for washing and dewatering the laundry through a transmission mechanism 106. The output terminal of an angular velocity controller 110 supplied with a command rotational angular velocity $\omega_m^*$ for indicating the rotational angular velocity of the three-phase induction motor is connected to the respective input terminals of a slip frequency calculator 112 and a rotary/static coordinate converter 118. The other input terminals of the slip frequency calculator 112 and the rotary/static coordinate converter 118 are supplied with a command exciting current $U_{1d}^*$. The two output terminals of the rotary/static coordinate converter 118 are connected to the two input terminals of a two-/three-phase converter 120, respectively. The three output terminals of the two-/three-phase converter 120 are connected to the three input terminals, respectively, of a current controller 122.

The three output terminals of the current controller 122 are connected to the three input terminals of a PWM invertor 124, respectively, and the three output terminals of the PWM invertor 124 are connected to the three-phase induction motor 100. The two input terminals of the PWM invertor 124 are connected through a converter 130 to a single-phase 100-VAC power supply. The three connection lines between the PWM invertor 124 and the three-phase induction motor 100 are provided with current detectors 126a, 126b and 126c, respectively. The output terminals of the current detectors 126a, 126b, 126c are connected to the three control input terminals of the current controller 122, respectively.

The three-phase induction motor 100 includes an angular velocity detector 128 for detecting the rotational angular velocity. The output terminal of the angular velocity detector 128 is connected to the control input terminal of the angular velocity controller 110 and the input terminal of an amplifier 115. The output terminal of the amplifier 115 is connected to the input terminal of an adder 114. The other input terminal of the adder 114 is connected to the output terminal of a slip frequency calculator 112. The output terminal of the adder 114 is connected to the input terminal of an integrator 116. The output terminal of the integrator 116 is connected to the other input terminal of the rotary/static coordinate converter 118.

The operation of the washing machine configured as described above will be explained below with reference to FIG. 1.

The laundry is washed by rotating the agitator 102 mounted in the rotatable drum 104 by the three-phase motor 100 through the transmission mechanism 106.

Generally, a three-phase induction motor can be considered as a two-phase model constituting a two-phase induction motor after three-/two-phase conversion. The fundamental equation for the two-phase induction motor is expressed in the following equation (1):

$$\begin{pmatrix} v_{1d} \\ v_{1q} \\ 0 \\ 0 \end{pmatrix} = \begin{pmatrix} \alpha & 0 & \beta & 0 \\ 0 & \alpha & 0 & \beta \\ \gamma & 0 & \delta & p\omega_m \\ 0 & \gamma & -p\omega_m & \delta \end{pmatrix} \begin{pmatrix} i_{1d} \\ i_{1q} \\ \psi_{2d} \\ \psi_{2q} \end{pmatrix} \quad (1)$$

$$\alpha = R_1 + \frac{L_1 L_2 - M^2}{L_2} \frac{d}{dt}$$

$$\beta = \frac{M}{L_2} \frac{d}{dt}, \quad \gamma = -\frac{R_2 M}{L_2}$$

$$\delta = \frac{R_2}{L_2} + \frac{d}{dt}$$

where $i_{1d}$, $i_{1q}$ are a d-axis current flowing in the stator constituting on the primary side and a q-axis current having a phase difference of 90 degree with the d-axis, respectively, and $v_{1d}$, $v_{1q}$ a d-axis voltage and a q-axis voltage having a phase difference of 90 degree with the d-axis, respectively. $\psi_{2d}$, $\psi_{2q}$ are secondary magnetic fluxes for the d-axis and the q-axis of the rotor on the secondary side, respectively. Also, $R_j$, $L_j$ (j: 1 or 2) is a resistance and an inductance, respectively, on the j-order side. Again, M is a mutual inductance, $\omega_m$ a rotational angular velocity of the motor, and p is the number of pole pairs providing the number of pairs of N and S poles of the motor.

As in the angular velocity control of the DC motor, the angular velocity controller 110 determines a command torque current $I_{1q}^*$ specifying the torque current for generating a torque in accordance with equation (2) below, for example, from the command rotational angular velocity $\omega_m^*$ and the value $\omega_m$ of the rotational angular velocity detected by the angular velocity detector 128.

$$I_{1q}^* = K_{is} \int_0^t (\omega_m^* - \omega_m) dt - K_{ps} \cdot \omega_m \qquad (2)$$

where $K_{ps}$, $K_{is}$ are angular velocity control gains providing constants set in such a manner as to attain the desired response characteristic.

The induction motor lacks a permanent magnet. In order to produce a magnetic field corresponding to the magnetic field created by a permanent magnet, therefore, a predetermined exciting current is supplied based on the command exciting current $I_{1d}^*$. Further, the slip frequency calculator 112 calculates the slip angular velocity $\omega_s$ using the command exciting current $I_{1d}^*$ and the command torque current $I_{1q}^*$ according to equation (3).

$$\omega_s = \frac{L_2}{R_2} \cdot \frac{I_{1q}^*}{I_{1d}^*} \qquad (3)$$

The product of the rotational angular velocity $\omega_m$ and the number p of pole pairs of the three-phase induction motor is determined by the amplifier 115, and this product is added to the slip angular velocity $\omega_s$ at the adder 114. The result of addition is integrated by the integrator 116 thereby to determine the electrical phase angle $\theta_o$ shown in equation (4).

$$\theta_0 = \int_0^t \omega_0 dt = \int_0^t (p \cdot \omega_m + \omega_s) dt \qquad (4)$$

Further, the rotary/static coordinate converter 118 makes calculations as shown in equation (5) using the command exciting current $I_{1d}^*$, the command torque current $I_{1q}^*$ and the electrical phase angle $\theta_o$ in the same manner as if a permanent magnet is involved.

$$\begin{pmatrix} i_{1d}^* \\ i_{1q}^* \end{pmatrix} = \begin{pmatrix} \cos\theta_0 & -\sin\theta_0 \\ \sin\theta_0 & \cos\theta_0 \end{pmatrix} \begin{pmatrix} I_{1d}^* \\ I_{1q}^* \end{pmatrix} \qquad (5)$$

As a result, the command exciting current $I_{1d}^*$ and the command torque current $I_{1q}^*$ are converted into command primary AC currents $i_{1d}^*$, $i_{2q}^*$ indicating two-phase currents having a phase difference of 90 degree. Then, the command primary AC currents $i_{1d}^*$, $i_{1q}^*$ are converted by the two-/three-phase converter 120 into command primary AC currents $i_{1a}^*$, $i_{1b}^*$, $i_{1c}^*$ indicating three-phase currents in accordance with equation (6).

$$\begin{pmatrix} i_{1a}^* \\ i_{1b}^* \\ i_{1c}^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} i_{1d}^* \\ i_{1q}^* \end{pmatrix} \qquad (6)$$

Once currents conforming with these command currents can be supplied, a three-phase induction motor having a performance equivalent to that of a DC motor is realized.

Now, the operation of the current controller 122 will be explained. The actual primary AC currents $i_{1a}$, $i_{1b}$, $i_{1c}$ are controlled by feedback in such a manner as to follow the command primary AC currents $i_{1a}^*$, $i_{1b}^*$, $i_{1c}^*$, respectively. In the process, the actual primary AC currents are detected by the current detectors 126a, 126b, 126c, and after making the calculations shown in equation (7), the command voltage $V_{1z}$ (z: a, b or c) is output.

$$V_{1z} = K_{ic} \int_0^t (i_{1z}^* - i_{1z}) dt - K_{pc} \cdot (i_{1z}^* - i_{1z}) \qquad (7)$$

where $K_{pc}$, $K_{ic}$ are current control gains which are constants set to follow a command value. In accordance with a signal having a pulse width corresponding to the command voltage $V_{1z}$ providing a control signal from the current controller 122, the PWM invertor 124 controls the DC voltage produced from a commercial power supply by the converter 130 by turning on or off internal transistors. As a result, the desired voltage is applied and the current is supplied to the three-phase induction motor 100.

Here, the sum of the primary AC currents $i_{1a}$, $i_{1b}$, $i_{1c}$ of the three phases supplied to the three-phase induction motor 100 is zero, as shown in equation (8).

$$i_{1a} + i_{1b} + i_{1c} = 0 \qquad (8)$$

For detecting the primary AC current, the currents of two out of the three phases are detected, and the current of the remaining phase can be calculated from the two-phase current values detected. The above-mentioned operation can control the primary AC current supplied to the three-phase induction motor to the desired command value, so that the rotational angular velocity of the three-phase induction motor can be controlled to the desired angular velocity.

The above-mentioned control system improves the controllability including the torque characteristic of a three-phase induction motor at the time of starting thereof, and a superior controllability like that of the DC motor can be obtained. Thus, a washing machine is easily realized in which a large amount of laundry can be washed at a time at the desired rotational angular velocity.

According to the first embodiment, an example was explained in which the current is detected for current control. As an alternative, the voltage can be controlled by estimating the current from the constants unique to the three-phase induction motor and the fundamental equation (1).

Also, although an example of a washing machine is shown for washing the laundry by rotating the agitator using a three-phase induction motor, the first embodiment is applicable to a washing machine of drum type with equal effect, for example, in which the agitator are not used and the rotatable drum is rotated directly.

According to the first embodiment, an angular velocity detector such as an encoder is required for detecting the rotational angular velocity of a three-phase induction motor. A second embodiment of the invention will be explained with reference to a washing machine using a controller of a three-phase induction motor with a good controllability equivalent to the DC motor even without any angular velocity detector.

Second Embodiment

A washing machine according to a second embodiment of the invention will be explained below with reference to FIG. 2.

FIG. 2 is a block diagram showing a configuration of a washing machine according to the second embodiment of the invention.

In FIG. 2, the rotational shaft 100A of the three-phase induction motor 100 is coupled to the transmission mechanism 106 for driving the rotational shaft 102A of the agitator 102 arranged in the rotatable drum 104. The output terminal of the angular velocity controller 110 supplied with the command rotational angular velocity $\omega_m{}^*$ is connected to the respective input terminals of the slip frequency calculator 112 and the rotary/static coordinate converter 118. The other input terminal of the slip frequency calculator 112 and the rotary/static coordinate converter 118 is supplied with the command exciting current $I_{1d}{}^*$.

The two output terminals of the rotary/static coordinate converter 118 are connected to the input terminal of the two-/three-phase converter 120, and the three output terminals of the two-/three-phase converter 120 are connected to the three input terminals of the current controller 122, respectively. The three output terminals of the current controller 122 are connected to the three input terminals of the PWM invertor 124, respectively. The three output terminals of the PWM invertor 124 are connected to the three-phase induction motor 100. The two input terminals of the PWM invertor 124 are connected to an AC power supply of 100 V, single phase, through the converter 130.

The three connection lines between the PWM invertor 124 and the three-phase induction motor 100 are provided with current detectors 126a, 126b, 126c, respectively. The output terminals of the current detectors 126a, 126b, 126c are connected to the three control input terminals of the current controller 122. The output terminals of the current detectors 126a, 126b, 126c are connected also to the three input terminals of the three-/two-phase converter 220, respectively. The two output terminals of the three-/two-phase converter 220 are connected to the two input terminals of a secondary magnetic flux estimator 224. Further, one of the two output terminals of the three-/two-phase converter 220 is connected to the input terminal of a first angular velocity estimator 226, and the other output terminal is connected to the input terminal of the second angular velocity estimator 228.

The three output terminals of the current controller 122 are connected to the three input terminals of the three-/two-phase converter 222, respectively. The two output terminals of the three-/two-phase converter 222 are connected to the other two input terminals of a secondary magnetic flux estimator 224, respectively. The two output terminals of the secondary magnetic flux estimator 224 are connected to the other two input terminals of the first angular velocity estimator 226, respectively. The other two output terminals of the secondary magnetic flux estimator 224 are connected to the other two input terminals of a second angular velocity estimator 228, respectively. The output terminals of the first angular velocity estimator 226 and the second angular velocity estimator 228 are connected to the two switching contacts of an estimated angular velocity switch 230, respectively. The common contact of the estimated angular velocity switch 230 is connected to the input terminals of the amplifier 115 and the angular velocity controller 115.

The output terminal of the amplifier 115 is connected to one of the input terminals of the adder 114. The other input terminal of the adder 114 is connected to the output terminal of the slip frequency calculator 112. The output terminal of the adder 114 is connected to the input terminal of an integrator 116. The output terminal of the integrator 116 is connected to the other input terminal of the rotary/static coordinate converter 118.

The operation of a washing machine configured as described above will be explained below with reference to FIG. 2.

The agitator 102 mounted in the rotatable drum 104 are rotated through the transmission mechanism 106 by the three-phase induction motor 100 thereby to wash the laundry.

The operation of the slip frequency calculator 112, the adder 114, the amplifier 115, the integrator 116, the rotary/static coordinate converter 118, the two-/three-phase converter 120, the current controller 122, the PWM invertor 124 and the converter 130 is the same as that of the corresponding component parts in the first embodiment, and therefore the description is omitted. The angular velocity controller 110 determines the command torque current $I_{1q}{}^*$ according to equation (9), for example, from the command rotational angular velocity $\omega_m{}^*$ of the three-phase induction motor and the estimated angular velocity $\omega_{me}$ of the output of the angular velocity estimator 200.

$$I_{1q}^* = K_{is} \int_0^t (\omega_m^* - \omega_{me}) dt - K_{ps} \cdot \omega_{me} \tag{9}$$

where $K_{ps}$, $K_{is}$ are angular velocity gains which are constants set in such a manner as to attain the desired response characteristic. Once the angular velocity is correctly estimated, as in the first embodiment, a controllability equivalent to the DC motor can be realized.

An example operation for estimating the rotary angular velocity of a three-phase induction motor will be explained below.

The three-/two-phase converter 220 converts the respective detection outputs $i_{1a}$, $i_{1b}$, $i_{1c}$ of the current detectors 126a, 126b, 126c, into the two-phase AC currents $i_{1d}$, $i_{1q}$ by using equation (10).

$$\begin{pmatrix} i_{1d} \\ i_{1q} \end{pmatrix} = \frac{\sqrt{2}}{\sqrt{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_{1a} \\ i_{1b} \\ i_{1c} \end{pmatrix} \tag{10}$$

Then, the other three-/two-phase converter 222 converts three-phase command voltages $v_{1z}$ (z is a, b or c) into two-phase AC voltages $v_{1d}$, $v_{1q}$ by using equation (11).

$$\begin{pmatrix} v_{1d} \\ v_{1q} \end{pmatrix} = \frac{\sqrt{2}}{\sqrt{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} v_{1a} \\ v_{1b} \\ v_{1c} \end{pmatrix} \tag{11}$$

From these two-phase AC currents and the two-phase AC voltages, the secondary magnetic fluxes $\psi_{2d}$, $\psi_{2q}$ can be estimated using equations (12) and (13) through the secondary magnetic flux estimator 224.

$$\psi_{2d} = \frac{L_2}{M} \int_0^t (v_{1d} - R_1 i_{1d}) dt - \frac{L_1 L_2 - M^2}{M} i_{1d} \tag{12}$$

$$\psi_{2q} = \frac{L_2}{M} \int_0^t (v_{1q} - R_1 i_{1q}) dt - \frac{L_1 L_2 - M^2}{M} i_{1q} \tag{13}$$

From the fundamental equation (1) for the three-phase induction motor in a two-phase model, the following two equations are obtained for estimating the rotational angular velocity $\omega_{me}$ of the three-phase induction motor.

$$\omega_{me} = \frac{1}{\psi_{2q}}\left(\frac{R_2}{L_2}M \cdot i_{1d} - \frac{R_2}{L_2}\psi_{2d} - \frac{d}{dt}\psi_{2d}\right) \quad (14)$$

$$\omega_{me} = \frac{1}{\psi_{2d}}\left(-\frac{R_2}{L_2}M \cdot i_{1q} + \frac{R_2}{L_2}\psi_{2q} + \frac{d}{dt}\psi_{2q}\right) \quad (15)$$

In these two equations, the denominator may take the value of zero, in the neighborhood of where the estimation accuracy is deteriorated. In the state that the three-phase induction motor is driven, however, the secondary magnetic flux $\psi_{2q}$ representing the denominator of equation (14) and the secondary magnetic flux $\psi_{2d}$ representing the denominator of equation (15) change in sinusoidal forms having 90 degrees of phase difference to each other. Therefore, it never occurs that both the denominators assume zero at the same time.

A first angular velocity estimator 226 calculates an estimated angular velocity numerator section representing the numerator in accordance with equation (14). The estimated angular velocity numerator section is divided by a denominator representing the secondary magnetic flux $\psi_{2q}$ to estimate the rotational angular velocity of the three-phase induction motor. Then, a second angular velocity estimator 228 calculates an estimated angular velocity numerator section representing the numerator in accordance with equation (15). The estimated angular velocity numerator section is divided by the denominator representing the secondary magnetic flux $\psi_{2d}$ to estimate the rotational angular velocity of the three-phase induction motor. Then, the magnitude of the secondary magnetic fluxes $\psi_{2d}$, $\psi_{2q}$ is measured and the one with the denominator not assuming a value in the neighborhood of zero is selected by an estimated angular velocity switch 230. As a result, the rotational angular velocity of the three-phase induction motor can be estimated always accurately.

In the above-mentioned method, a large torque can be produced in a wide range of low to high speeds without using the angular velocity detector 128 unlike in the first embodiment. A washing machine capable of washing a large amount of laundry can be realized easily.

The two-/three-phase converter 120 forms the three-phase command primary AC current, and the three-phase primary AC current is compared with the three-phase command primary AC current in the current controller 122, so that the three-phase primary AC current is controlled. In another method, the three-phase primary AC current detected by the current detectors 126a, 126b, 126c is converted into a two-phase primary AC current at the three-/two-phase converter 220. This two-phase current is compared with the two-phase command primary AC current before being applied to the two-/three-phase converter 120. Based on the result of comparison, the current is controlled, and the two-phase command voltage can be converted to a three-phase command voltage through the two-/three-phase converter.

Also according to the second embodiment, a command voltage is used in place of the actual voltage. This leads to the advantage that a voltage detector is eliminated. In such a case, the accuracy of the command voltage is further improved if the affect of time delay or the like that occurs when the PWM invertor 124 is turned on is corrected.

The second embodiment also represents an example of a washing machine for washing laundry by rotating agitator driven by a three-phase induction motor. This embodiment is applicable to a washing machine of drum type with equal effect, for example, in which the agitator are not used and a rotatable drum is directly rotated.

Third Embodiment

In the first and second embodiments, the exciting current for generating a magnetic field is controlled to a constant level in the same manner as if a permanent magnet is incorporated in the three-phase induction motor. In order to obtain a large torque in high rotational speed range, however, an increased exciting current is required, and therefore a high DC voltage is required. The DC voltage output from the converter 130, which is determined by the voltage of the commercial power supply, has a limited voltage value.

As a third embodiment of the present invention, explanation will be made as to a washing machine comprising a controller for a three-phase induction motor which can produce a comparatively large torque by the voltage of the commercial power supply even in high rotational speed range such as when the laundry is dewatered.

Figure 3:
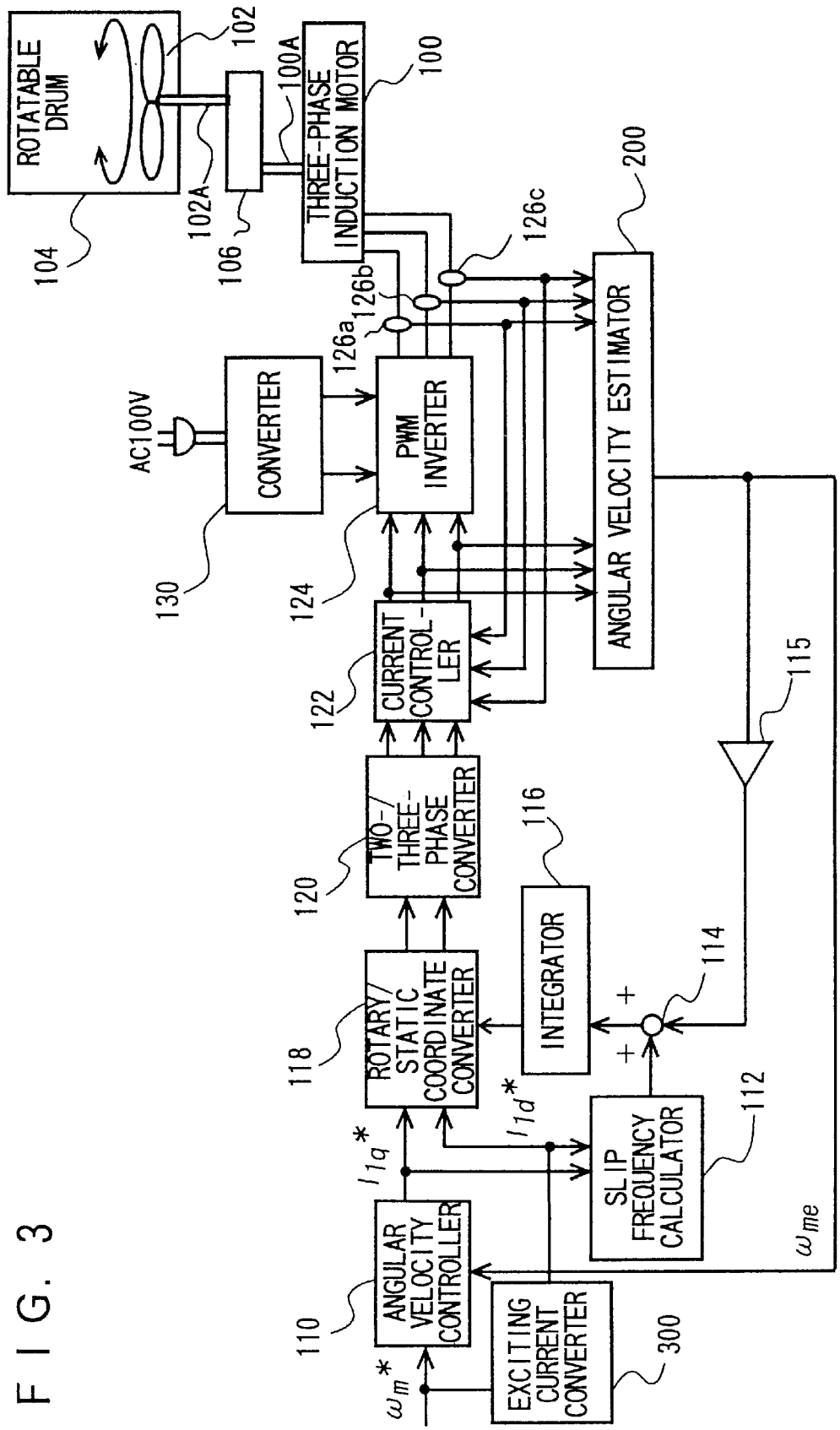
FIG. 3 is a block diagram showing a configuration of a washing machine according to a third embodiment of the invention.

A washing machine according to the third embodiment is explained below with reference to FIG. 3. FIG. 3 is a block diagram showing a configuration of a washing machine according to the third embodiment of the invention.

In FIG. 3, the rotary shaft 100A of the three-phase induction motor 100 is coupled to the rotary shaft 102A of the agitator 102 arranged in the rotatable drum 104 through the transmission mechanism 106. The output terminal of the angular velocity controller 110 supplied with a command rotational angular velocity $\omega_m^*$ is connected to the respective input terminals of the slip frequency calculator 112 and the rotary/static coordinate converter 118. The input terminal of an exciting current converter 300 is connected to the input terminal of the angular velocity controller 110.

The other input terminal of the slip frequency calculator 112 and the rotary/static coordinate converter 118 is connected to the output terminal of the exciting current converter 300. The two output terminals of the rotary/static coordinate converter 118 are connected to the two input terminals of a two-/three-phase converter 120. The three output terminals of the two-/three-phase converter 120 are connected to the three input terminals of the PWM invertor 124. The three output terminals of the PWM invertor 124 is connected to the three-phase induction motor 100. The two input terminals of the PWM invertor 124 are connected to an AC power supply of single phase, 100 V, through the converter 130. The three connection lines between the PWM invertor 124 and the three-phase induction motor 100 are provided with the current detectors 126a, 126b, 126c, respectively. The output terminals of the current detectors 126a, 126b, 126c are connected to the three input control terminals of the current controller 122, respectively, and to the three input terminals of the angular velocity estimator 200, respectively.

The output terminal of the angular velocity estimator 200 is connected to the input terminal of the amplifier 115 and to the input terminal of the angular velocity controller 110. The output terminal of the amplifier 115 is connected to one of the input terminals of the adder 114. The other input terminal of the adder 114 is connected to the output terminal of the slip frequency calculator 112. The other output terminal of the adder 114 is connected to the input terminal of the integrator 116. The output terminal of the integrator 116 is connected to the other input terminal of the rotary/static coordinate converter 118.

The operation of a washing machine configured as described above will be explained with reference to FIG. 3 below.

Also in the third embodiment, the laundry is washed by rotating the agitator 102 which are mounted in the rotatable drum 104 and driven by the three-phase induction motor 100 through the transmission mechanism 106.

The operation of the angular velocity controller 110, the slip frequency calculator 112, the adder 114, the amplifier 115, the integrator 116, the rotary/static coordinate converter 118, the two-/three-phase converter 120, the current controller 122, the PWM converter 124, the converter 130 and the angular velocity estimator 200 is the same as that of the corresponding units in the second embodiment, respectively, and therefore the description is omitted.

In this embodiment, the washing machine further comprises an exciting current converter 300 supplied with a command rotational angular velocity $\omega_m^*$ for outputting a command exciting current $I_{1d}^*$. In the case where the three-phase induction motor is driven at such a high speed as at the time of dewatering, the maximum control value of the primary AC voltage output from the current controller 122 exceeds a DC output voltage which is an output of the converter 130 determined by a source voltage. For this reason, the desired torque cannot be generated and the rotational angular velocity of the motor is reduced.

At the time of dewatering, therefore, the command exciting current $I_{1d}^*$ is reduced as compared with the time when the rotational angular velocity is low as at the time of washing. As a result, a comparatively large torque can be generated even in high speed range, thereby improving the dewatering capability.

Although this embodiment represents an example of the washing machine for washing laundry by rotating the agitator by the three-phase induction motor, the embodiment is applicable also to a washing machine of drum type in which the agitator are not used, and the rotatable drum is rotated directly.

Fourth Embodiment

In the single-phase induction motor operated only at a predetermined angular velocity determined by the power frequency, the rise characteristic of the rotational angular velocity cannot be changed.

In view of this, in a fourth embodiment of the invention, a washing machine will be explained below, which realizes an operation with low vibrations and low noises by alleviating the shocks when the agitator start rotating or reverse.

The washing machine according to the fourth embodiment of the invention will be explained with reference to FIG. 4.

Figure 4:
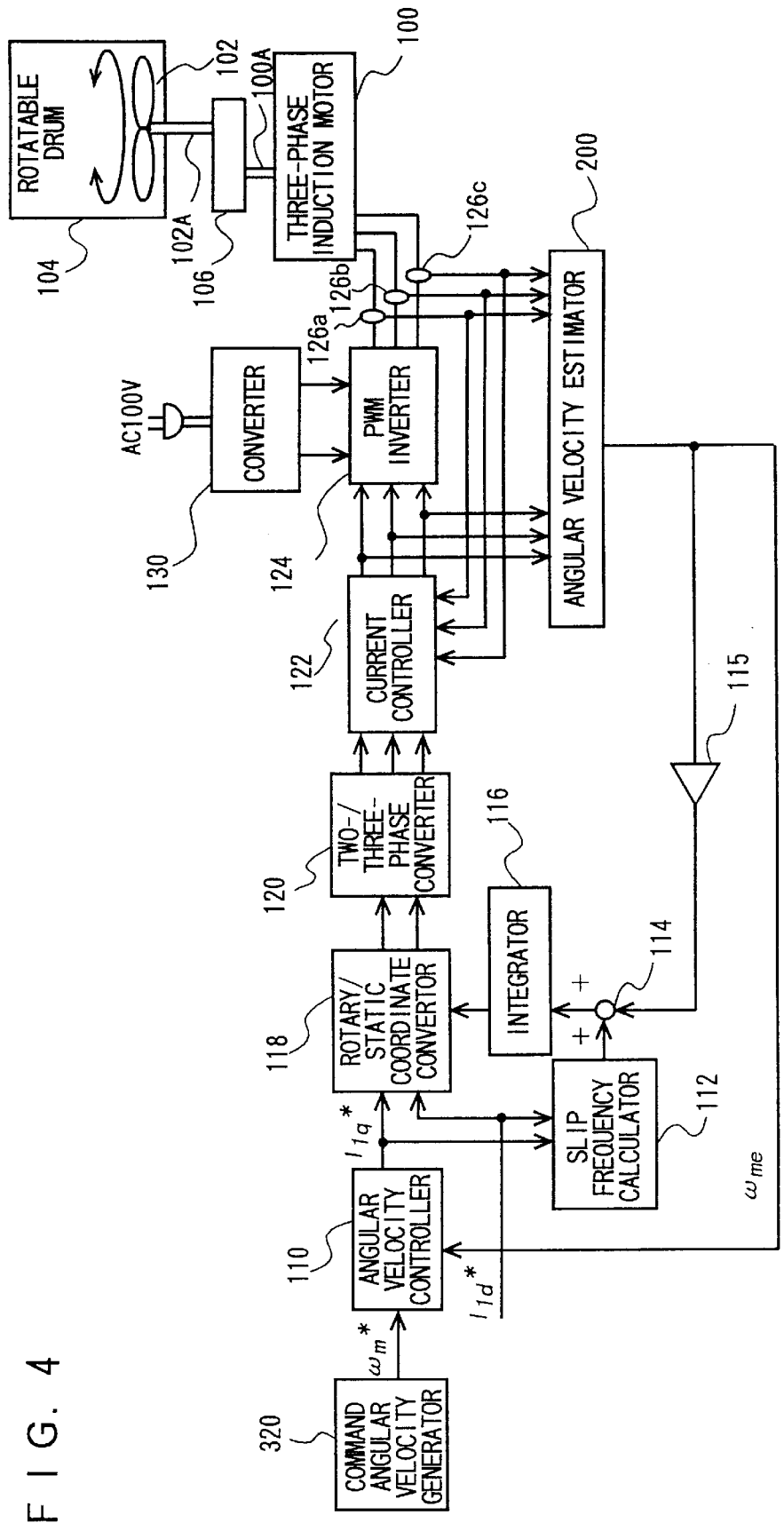
FIG. 4 is a block diagram showing a configuration of a washing machine according to a fourth embodiment of the invention.

FIG. 4 is a block diagram showing a configuration of the washing machine according to the fourth embodiment of the invention.

In FIG. 4, the rotary shaft lOOA of the three-phase induction motor 100 is coupled to the rotary shaft 102A of the agitator 102 arranged in the rotatable drum 104 through the transmission mechanism 106. The output terminal of the command angular velocity generator 320 is connected to the input terminal of the angular velocity controller 110, and the command rotational angular velocity $\omega_m^*$ is supplied to the angular velocity controller 110. The output terminal of the angular velocity controller 110 is connected to respective input terminals of the slip frequency calculator 112 and the rotary/static coordinate converter 118. The other input terminal of the slip frequency calculator 112 and the rotary/static coordinate converter 118 is supplied with the command exciting current $I_{1d}^*$.

The two output terminals of the rotary/static coordinate converter 118 are connected to the two input terminals of the two-/three-phase converter 120, respectively. The three output terminals of the two-/three-phase converter 120 are connected to the three input terminals of the current controller 122, respectively. The three output terminals of the current controller 122 are connected to the three input terminals of the PWM invertor 124, respectively, and to the three input terminals of the angular velocity estimator 200, respectively. The three output terminals of the PWM invertor 124 are connected to the three-phase induction motor 100. The two input terminals of the PWM invertor 124 are connected to an AC power supply of single phase 100 V through the converter 130.

Three connection lines between the PWM invertor 124 and the three-phase induction motor 100 are provided with the current detectors 126a, 126b, 126c, respectively. The output terminals of the current detectors 126a, 126b, 126c are connected to the three control input terminals of the current controller 122, respectively, and to the three input terminals of the angular velocity estimator 200, respectively.

The output terminal of the angular velocity estimator 200 is connected to the input terminal of the amplifier 115 and the other input terminal of the angular velocity controller 110. The output terminal of the amplifier 115 is connected to one of the input terminals of the adder 114. The other input terminal of the adder 114 is connected to the output terminal of the slip frequency calculator 112. The output terminal of the adder 114 is connected to the input terminal of the integrator 116. The output terminal of the integrator 116 is connected to the other input terminal of the rotary/static coordinate converter 118.

Figure 5:
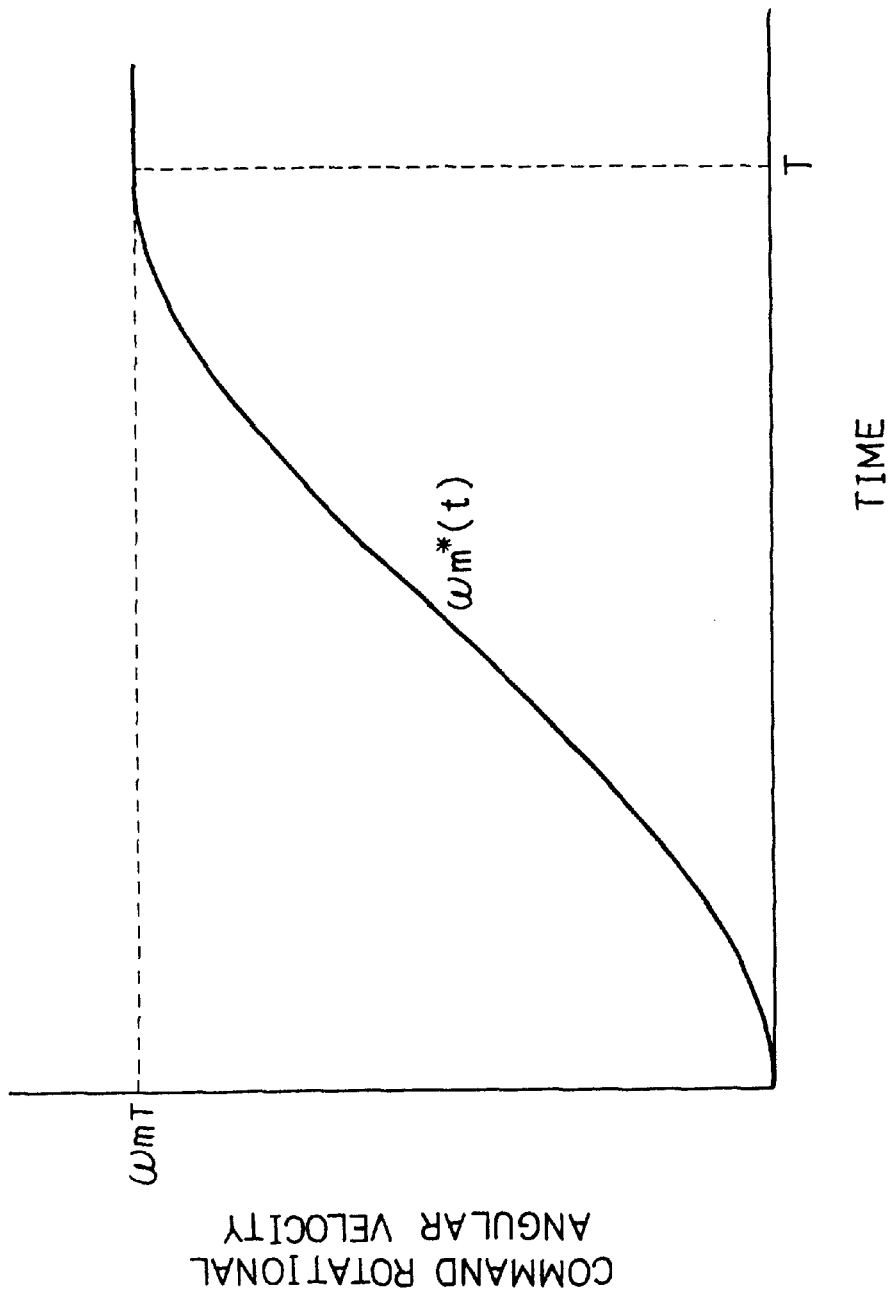
FIG. 5 is a graph showing the relation between command rotational angular velocity and time according to the fourth embodiment of the invention.

The operation of the washing machine having the above-mentioned configuration will be explained below with reference to FIGS. 4 and 5.

Also in the fourth embodiment, the laundry is washed by rotating the agitator 102 mounted in the rotatable drum 104 and driven by the three-phase induction motor 100 through the transmission mechanism 106.

The operations of the angular velocity controller 110, the slip frequency calculator 112, the adder 114, the amplifier 115, the integrator 116, the rotary/static coordinate converter 118, the two-/three-phase converter 120, the current controller 122, the PWM invertor 124, the converter 130 and the angular velocity estimator 200 are the same as those of the corresponding component parts in the third embodiment, and therefore will not be described again.

Assuming that the command rotational angular velocity $\omega_m^*$ changing stepwise is applied to the three-phase induction motor in the conventional washing machine with the agitator 102 rotating at a constant angular velocity, the washing machine is operated with a shock due to transient response decided by the angular velocity control gain. Consequently, in order to rise the rotational angular velocity monotonously and smoothly without abrupt changes, the angular velocity control gain must be set to a low level. With the low level of angular velocity control gain, however, the disturbance suppression characteristic is deteriorated, when the laundry is caught in the agitator or otherwise. Another problem is that a rise time varies according to the amount of laundry. In view of this, a command rotational angular velocity $\omega_m^*(t)$ is set by a time function of third order as expressed by equation (16) representing the curve of FIG. 5, for example.

$$\omega_m^*(t) = \omega_{mT} \cdot (-2\tau_T^3 + 3\tau_T^2) \qquad (16)$$

-continued $$\tau_T = \frac{t}{T}$$

where T designates the rise time, and $\omega_{mT}$ designates a target rotational angular velocity. The command torque current $I_{1q}*$ is given in equation (17) below, for example, using the estimated angular velocity value $\omega_{me}$.

$$I_{1q}^* = K_{is}\int_0^t (\omega_m^*(t) - \omega_{me})dt - K_{ps}\cdot\omega_{me} \qquad (17)$$

As a result, the desired transient response characteristic can be realized, and a washing machine of low vibrations and low noises is realized with the shock alleviated at the time of starting operation and reversing operation.

Although the command rotational angular velocity $\omega_m*(t)$ is given by the time function of third order in this embodiment, a continuous function such as a sinusoidal function or a combination of a plurality of functions can also be employed.

Also in the fourth embodiment, an example is shown of a washing machine in which the laundry is washed by rotating the agitator driven by the three-phase induction motor. Instead, this embodiment is also applicable to the washing machine of drum type, for example, in which the agitator are not used and the rotatable drum is rotated directly.

Fifth Embodiment

In a washing process, if a proper quantity of water is supplied in accordance with the amount of laundry, the problem of insufficient washing is solved or water consumption is reduced. For this purpose, the amount (e.g. weight) of laundry must be estimated accurately before water is supplied.

As a fifth embodiment of the invention, a washing machine will be explained which can estimate the amount of laundry accurately by test rotating the agitator before water is supplied.

Figure 6:
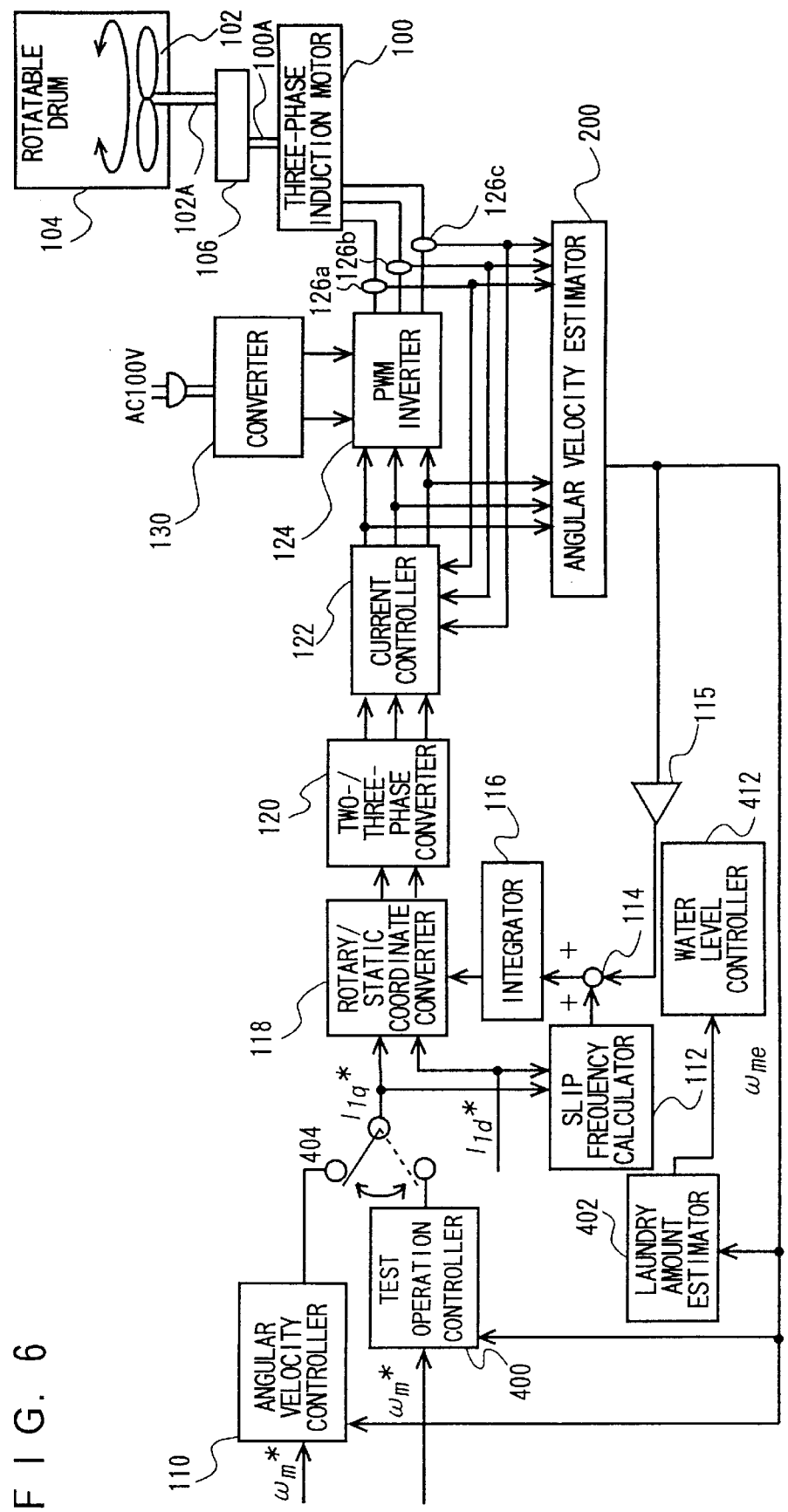
FIG. 6 is a block diagram showing a configuration of a washing machine according to a fifth embodiment of the invention.

FIG. 6 is a block diagram showing a configuration of a washing machine according to the fifth embodiment of the invention.

In FIG. 6, the rotary shaft 100A of the three-phase induction motor 100 is coupled to the rotary shaft 102A of the agitator 102 arranged in the rotatable drum 104 through the transmission mechanism 106. The output terminals of the angular velocity controller 110 and a test operation controller 400 supplied with the command rotational angular velocity $\omega_m*$ are connected to two switching contacts of a switch 404, respectively. The common contact of the switch 404 is connected to the input terminals of the slip frequency calculator 112 and the rotary/static coordinate converter 118. The command exciting current $I_{1d}*$ is applied to the other input terminals of the slip frequency calculator 112 and the rotary/static coordinate converter 118. The two output terminals of the rotary/static coordinate converter 118 are connected to the input terminals of the two-/three-phase converter 120. The three output terminals of the two-/three-phase converter 120 are connected to the three input terminals of the current controller 122, respectively. The three output terminals of the current controller 122 are connected to the three input terminals of the PWM invertor 124, respectively. The three output terminals of the PWM invertor 124 are connected to the three-phase induction motor 100. The two input terminals of the PWM invertor 124 are connected through the converter 130 to a single-phase AC power supply of 100 V.

The three connection lines between the PWM invertor 124 and the three-phase induction motor 100 are provided with the current detectors 126a, 126b, 126c, respectively. The output terminals of the current detectors 126a, 126b, 126c are connected to the three control input terminals of the current controller 122 and to the three input terminals of the angular velocity estimator 200.

The output terminal of the angular velocity estimator 200 is connected to the input terminals of the amplifier 115, the angular velocity controller 110, the test operation controller 400 and a laundry amount estimator 402. The output terminal of the amplifier 115 is connected to one of the input terminals of the adder 114. The other input terminal of the adder 114 is connected to the output terminal of the slip frequency calculator 112. The output terminal of the adder 114 is connected to the input terminal of the integrator 116. The output terminal of the integrator 116 is connected to the other input terminal of the rotary/static coordinate converter 118. The output terminal of the laundry amount estimator 402 is connected to the input terminal of a water level regulator 412 for regulating the amount of water in the rotatable drum 104.

The operation of the washing machine having the above-mentioned configuration will be explained with reference to FIG. 6.

In estimating the amount of laundry, as in washing the laundry, the agitator 102 mounted in the rotatable drum 104 are test operated through the transmission mechanism 106 by the three-phase induction motor 100. For example, estimation may be made after water is supplied into the rotatable drum 104. This method, however, has the disadvantage that the user has to wait until water is completely supplied. Therefore, estimation before water supply is desirable. However, when the agitator 102 is rotated before water supply in a similar manner to washing, estimation accuracy is deteriorated by undesirable raising and rolling up the laundry, or by hanging laundry with the agitator 102. Especially during the transient response, the effect of laundry being caught becomes more conspicuous and the estimation accuracy is further deteriorated.

Before conducting a test operation for estimating the laundry amount, the first step is to turn the switch 404 to the test operation controller 400. In order to facilitate the estimation of the laundry amount, the test operation controller 400 controls the command torque current $I_{1q}*$ as represented by equation (18) below based on the command rotational angular velocity $\omega_m*$ of the three-phase induction motor and the estimated angular velocity $\omega_{me}$ output from the angular velocity estimator 200.

$$I_{1q}^* = K_{ps}\cdot(\omega_m^* - \omega_{me}) \qquad (18)$$

where $K_{ps}$ is the angular velocity control gain. The operation of the slip frequency calculator 112, the adder 114, the amplifier 115, the integrator 116, the rotary/static coordinate converter 118, the two-/three-phase converter 120, the current controller 122, the PWM invertor 124, the converter 130 and the angular velocity estimator 200 is the same as that of the corresponding component parts of the second embodiment, respectively, and therefore will not be explained again.

In the case where the command torque current $I_{1q}*$ is given by equation (18), which includes no integration term unlike for washing. Consequently, the rotational angular velocity of the three-phase induction motor decreases with the increase in the amount of laundry providing the load. The amount of laundry, therefore, can be easily estimated from the magnitude of an estimated angular velocity output from the angular velocity estimator 200.

In the case that the laundry amount is divided into five stages, for example, the laundry amount estimator 402 divides the estimated angular velocity $\omega_{me}$ and threshold values ω1 to ω4 predetermined by test into equations (19), (20), (21), (22) and (23) for comparison.

$$|\omega_{me}| \geq \omega 1 \text{ (Laundry amount is very small)} \tag{19}$$

$$\omega 2 \leq |\omega_{me}| < \omega 1 \text{ (Laundry amount is small)} \tag{20}$$

$$\omega 3 \leq |\omega_{me}| < \omega 2 \text{ (Laundry amount is medium)} \tag{21}$$

$$\omega 4 \leq |\omega_{me}| < \omega 3 \text{ (Laundry amount is large)} \tag{22}$$

$$|\omega_{me}| < \omega 4 \text{ (Laundry amount is very large)} \tag{23}$$

The control gain $K_{ps}$ in equation (18) is preferably set low in order that the rotational angular velocity of the three-phase induction motor may become sufficiently low in the case where the maximum laundry possible to wash is loaded. Also, the command rotational angular velocity $\omega_m^*$ should not be set higher than the angular velocity for washing. Otherwise, the rotational angular velocity increases so large as to increase the probability of the laundry being rounded.

After the amount of laundry is estimated, the water level regulator 412 determines the amount of water to be supplied in the rotatable drum 104 in accordance with the estimated amount of laundry. Then, the switch 404 is turned to the angular velocity controller 110 and the washing is carried out as explained in the second embodiment.

In this embodiment, the laundry amount is estimated from the magnitude of the estimated angular velocity. The estimated angular velocity is more varied with the increase in the laundry amount. In order to obviate this inconvenience, the test operation is conducted a plurality of times, and the resulting variation in the estimated angular velocity can be used to estimate the laundry amount.

Also, instead of estimating the laundry amount from the magnitude of the estimated angular velocity as in the present embodiment, the torque current component can be used for estimation as in the method described below.

First, in order to facilitate the estimation of the laundry amount in a test operation for estimating the laundry amount, the test operation controller 400 gives the command torque current $I_{1q}^*$ from equation (24) below as in the angular velocity controller 110. The command torque current $I_{1q}^*$ is based on the command rotational angular velocity $\omega_m^*$ of the three-phase induction motor and the estimated angular velocity $\omega_{me}$ output from the angular velocity estimator 200.

$$I_{1q}^* = K_{iL} \int_0^t (\omega_m^* - \omega_{me}) dt - K_{pL} \cdot \omega_{me} \tag{24}$$

where $K_{pL}$, $K_{iL}$ are angular velocity control gains. The equation (24) contains the term of integration of angular velocity error. Therefore, when the command torque current $I_{1q}^*$ is given by equation (24), the command torque current continues to increase until the estimated angular velocity comes to follow the command rotational angular velocity regardless of the laundry amount. In other words, the command torque current increases with the amount of laundry. Thus, the amount of laundry can be easily estimated not from the magnitude of the estimated angular velocity but from the command torque value.

The change of the command torque current increases the slip angular velocity according to equation (3), thereby increasing the frequency of the primary AC current and the primary AC voltage. The amount of laundry, therefore, can be estimated also from the magnitude of frequency of these factors.

Further, the response time from the time point of starting the test operation to the time point when the estimated angular velocity reaches the neighborhood of the command rotational angular velocity, i.e. the response time before the error between the estimated angular velocity and the command rotational angular velocity enters a predetermined error margin, increases with the increase in laundry amount. Therefore, the amount of laundry can also be estimated by measuring this response time. In this case, in order to improve the estimation accuracy of the laundry amount, the angular velocity control gains $K_{pL}$, $K_{iL}$ can be decreased as compared with the time of washing operation.

Also, the amount of laundry can be estimated by setting the command torque current at a predetermined constant value and measuring the time length from the time point when the test operation is started to the time point when the estimated angular velocity reaches a specified value. In this case, too, in order to improve the estimation accuracy of the laundry amount, the command torque current can be set at a value associated with a torque smaller than the one generated at the time of normal washing.

Sixth Embodiment

Equations (12) to (15) for estimating the rotational angular velocity of the three-phase induction motor or equation (3) for calculating the slip angular velocity use constants unique to the three-phase induction motor such as the resistance $R_j$ on j-order (j: 1 or 2) side, the inductance $L_j$ on j-order side and a mutual inductance M. These constants unique to the three-phase induction motor, however, are varied under the effect of such factors as variations in motor manufacture.

In view of this, a washing machine according to a sixth embodiment of the invention will be explained, in which an always optimum washing operation can be performed by measuring the constants unique to the three-phase induction motor.

A washing machine according to the sixth embodiment of the invention will be explained with reference to FIG. 7.

FIG. 7 is a block diagram showing a configuration of a washing machine according to the sixth embodiment of the invention.

In FIG. 7, the rotary shaft 100A of the three-phase induction motor 100 is coupled to the rotary shaft 102A of the agitator 102 arranged in the rotatable drum 104 through the transmission mechanism 106. The output terminal of the angular velocity controller 110 supplied with the command rotational angular velocity $\omega_m^*$ is connected to respective input terminals of the slip frequency calculator 112 and the rotary/static coordinate converter 118. The other input terminal of the slip frequency calculator 112 and the rotary/static coordinate converter 118 is supplied with the command exciting current $I_{1d}^*$.

The two output terminals of the rotary/static coordinate converter 118 are connected to the input terminals of the two-/three-phase converter 120. The three output terminals of the two-/three-phase converter 120 are connected to the three switching contacts of a three-circuit switch 452, respectively. The other three switching contacts of the switch 452 are connected to the three output terminals of a constant measurement current commander 450, respectively. The three common contact points of the switch 452 are connected to the three input terminals of the current controller 122, respectively. The three output terminals of the current controller 122 are connected to the three input terminals of the PWM invertor 124, respectively. The three output terminals of the PWM invertor 124 are connected to the three-phase induction motor 100.

Two input terminals of the PWM invertor 124 are connected through the converter 130 to an AC power supply of single phase, 100 V. Three output terminals of the current controller 122 are connected to the three common contacts of a three-circuit switch 456, respectively. The three connection lines between the PWM invertor 124 and the three-phase induction motor 100 are provided with the current detectors 126a, 126b, 126c, respectively. The output terminals of the current detectors 126a, 126b, 126c are connected to the three control input terminals, respectively, of the current controller 122 on the one hand and to the three common terminals of the three-circuit switch 458 on the other hand. The three switching contacts of each of the switches 456, 458 are connected to the input terminals of the angular velocity estimator 200, and the other three switching contacts thereof are connected to the input terminals of a motor constant measurement device 454.

The output terminal of the angular velocity estimator 200 is connected to the input terminals of the angular velocity controller 110 and the amplifier 115. The output terminal of the motor constant measurement device 454 is connected to the input terminals of the slip frequency calculator 112 and the angular velocity estimator 200. The output terminal of the amplifier 115 is connected to one of the input terminals of the adder 114. The other input terminal of the adder 114 is connected to the output terminal of the slip frequency calculator 112. The output terminal of the adder 114 is connected to the input terminal of the integrator 116. The output terminal of the integrator 116 is connected to the other input terminal of the rotary/static coordinate converter 118.

The operation of the washing machine configured as described above will be explained with reference to FIG. 7.

Also in this embodiment, the laundry is washed by rotating the agitator 102 mounted in the rotatable drum 104 and driven by the three-phase induction motor 100 through the transmission mechanism 106.

The operation of the angular velocity controller 110, the slip frequency calculator 112, the adder 114, the amplifier 115, the integrator 116, the rotary/static coordinate converter 118, the two-/three-phase converter 120, the current controller 122, the PWM invertor 124, the converter 130 and the angular velocity estimator 200 is identical to that of the corresponding component parts of the fifth embodiment, and therefore will not be described again.

Now, the measurement of constants unique to the three-phase induction motor will be explained.

A method of measuring constants unique to a three-phase induction motor in stationary state is described in the National Convention Record I.E.E. JAPAN Industry Applications Society, 1996, "Method of Measuring Constants of Induction Motor", pp.375–378, for example. In measuring the constants unique to the three-phase induction motor by this method, a current is supplied to the motor in stationary state from the constant measurement current commander 450 for a short length of time (say, several seconds) for making measurements. Therefore, the measurement cannot be carried out while the motor is running.

According to the sixth embodiment, the input to the current controller 122 is turned from the two-/three-phase converter 120 to the constant measurement current commander 450 by the switch 452 during the time when power is supplied to the motor or the motor is not running at the time of supplying water or dewatering. Further, the outputs of the current controller 122 and output of the current detectors 126a, 126b, 126c are turned from the angular velocity estimator 200 to the motor constant measurement device 454 by the switches 456, 458. Then, the constants unique to the three-phase induction motor are measured. After that, the constants unique to the three-phase induction motor used for the slip frequency calculator 112 and the angular velocity estimator 200 are changed.

As a result, the manufacturing variations of individual motors are compensated. The effect of variations of the constants unique to the three-phase induction motor thus can be suppressed by measuring the variations of the resistance value due to an increased temperature of a running motor each time water is supplied or the laundry is dewatered. Thus, an always optimum washing operation can be carried out.

Seventh Embodiment

Among the constants unique to the three-phase induction motor, the self-inductance and the mutual inductance do not change during the motor operation. Thus, the values of the self-inductance and the mutual inductance, once measured, can be stored in a motor constant memory, and the motor can be controlled using the values stored in the motor constant memory.

Even in the case where the constants unique to the three-phase induction motor are known in advance, the three-phase induction motor, once started, might increases in temperature causing a change in resistance $R_j$.

In order to obviate the above-mentioned problem, a washing machine will be explained below as a seventh embodiment of the invention. In the seventh embodiment, the resistance change with the temperature increase of the motor is corrected and an always optimum washing operation is performed.

Figure 8:
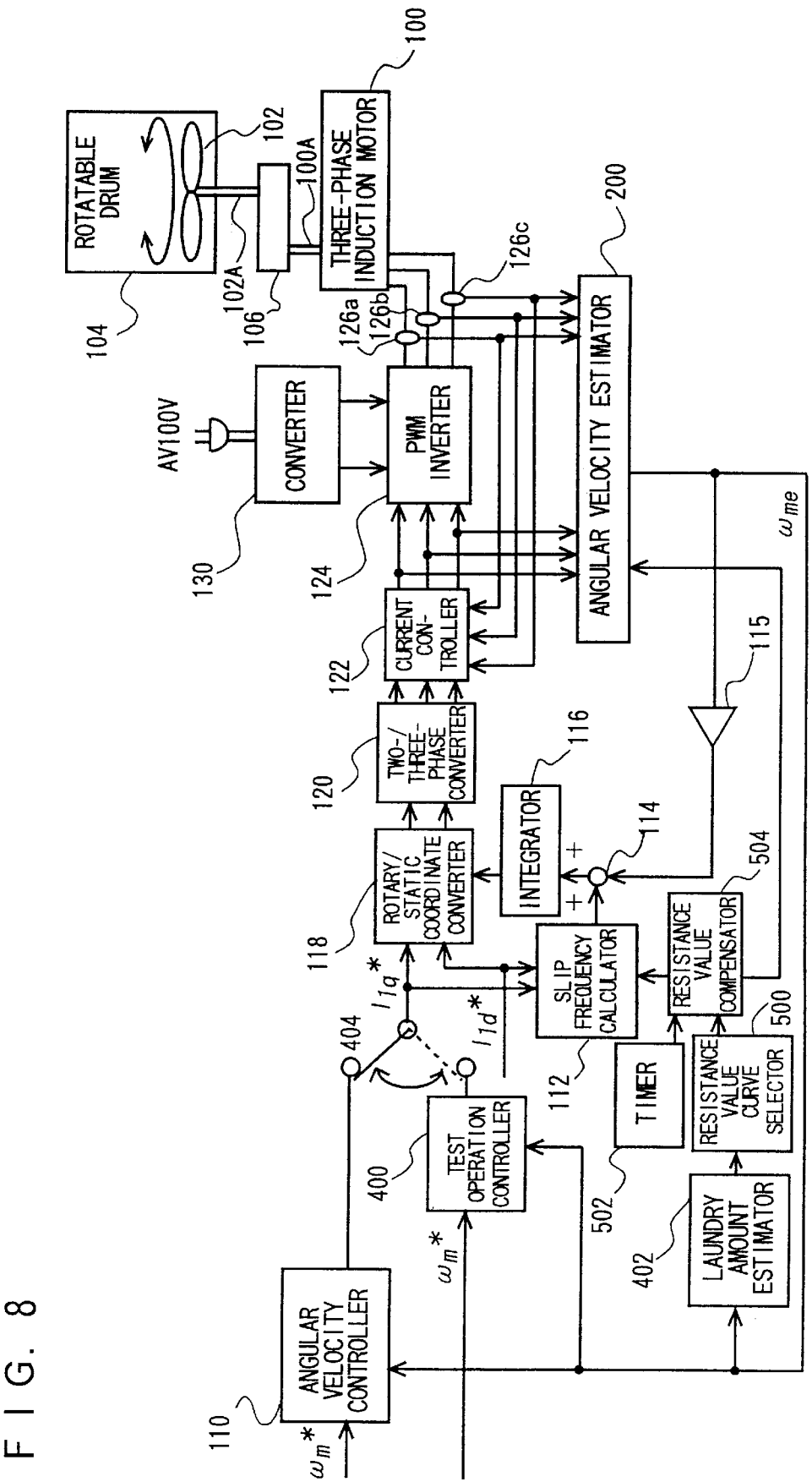
FIG. 8 is a block diagram showing a configuration of a washing machine according to a seventh embodiment of the invention.

A washing machine according to the seventh embodiment of the invention will be explained with reference to FIG. 8. FIG. 8 is a block diagram showing a configuration of a washing machine according to the seventh embodiment of the invention.

In FIG. 8, the rotary shaft 100A of the three-phase induction motor 100 is coupled to the rotary shaft 102A of the agitator 102 arranged in the rotatable drum 104 through the transmission mechanism 106. The output terminal of the angular velocity controller 110 supplied with the command rotational angular velocity $\omega_m{}^*$ is connected to one of the switching contacts of the switch 404. The other switching contact of the switch 404 is connected to the output terminal of the test operation controller 400 supplied with the command rotational angular velocity $\omega_m{}^*$. The common contact of the switch 404 is connected to the respective input terminals of the slip frequency calculator 112 and the rotary/static coordinate converter 118. The other input terminals of the slip frequency calculator 112 and the rotary/static coordinate converter 118 are supplied with the command exciting current $I_{1d}{}^*$.

The two output terminals of the rotary/static coordinate converter 118 are connected to two input terminals of the two-/three-phase converter 120, respectively. The three output terminals of the two-/three-phase converter 120 are connected to the three input terminals of the current controller 122, respectively. The three output terminals of the current controller 122 are connected to the three input terminals of the PWM invertor 124 on the one hand and to the three input terminals of the angular velocity estimator 200, on the other hand, respectively. The three output terminals of the PWM invertor 124 are connected to the three-phase induction motor 100. The two input terminals of the PWM invertor 124 are connected through the converter 130 to a single-phase AC power supply of 100 V. The three connection lines between the PWM invertor 124 and the three-phase induction motor 100 are provided with the current detectors 126a, 126b, 126c, respectively. The output terminals of the current detectors 126a, 126b, 126c are connected to the three control input terminals of the current controller 122 on the one hand and to the other three input terminals of the angular velocity estimator 200 on the other hand, respectively.

The output terminal of the angular velocity estimator 200 is connected to the input terminals of the angular velocity controller 110, the test operation controller 400, the laundry amount estimator 402 and the amplifier 115. The output terminal of the amplifier 115 is connected to one of the input terminals of the adder 114. The other input terminal of the adder 114 is connected to the output terminal of the slip frequency calculator 112. The output terminal of the adder 114 is connected to the input terminal of the integrator 116. The output terminal of the integrator 116 is connected to the other input terminal of the rotary/static coordinate converter 118. The output terminal of the laundry amount estimator 402 is connected to the input terminal of a resistance value curve selector 500. The output terminal of the resistance value curve selector 500 is connected to the input terminal of a resistance value compensator 504. The resistance value compensator 504 is connected also to a timer 502. The two output terminals of the resistance value compensator 504 are connected to the input terminals of the slip frequency calculator 112 and the angular velocity estimator 200, respectively.

Figure 9:
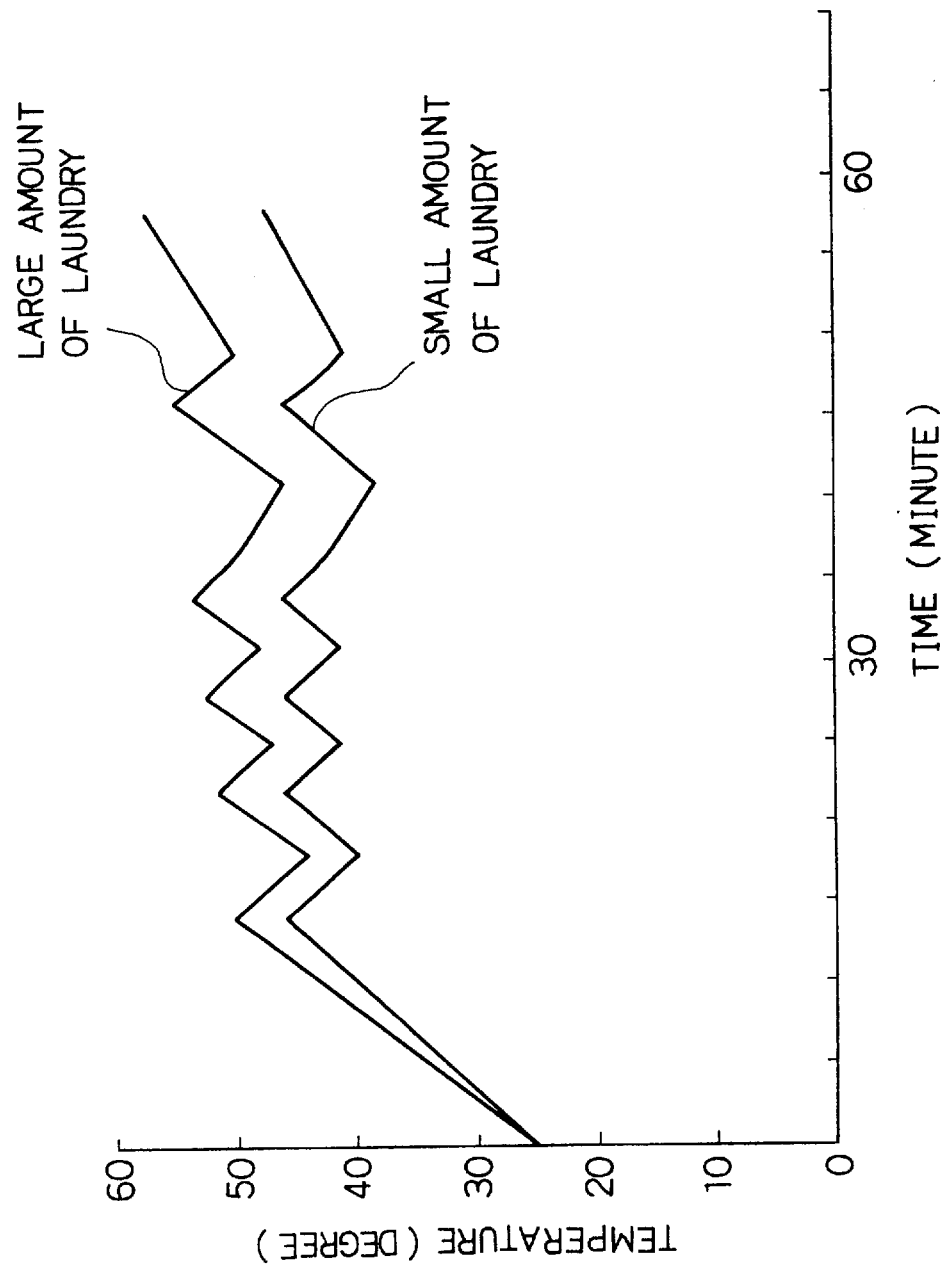
FIG. 9 is a graph showing the relation between operation time and temperature representing an example of temperature increase of a three-phase induction motor according to the invention.

FIG. 9 is a graph showing the operation time and the temperature with the laundry amount as a parameter for the three-phase induction motor according to the invention.

The operation of a washing machine configured as described above will be explained below with reference to FIGS. 8 and 9.

Also in this embodiment, the laundry is washed by rotating the agitator 102 mounted in the rotatable drum and driven by the three-phase induction motor 100 through the transmission mechanism 106.

The operation of the angular velocity controller 110, the slip frequency calculator 112, the adder 114, the amplifier 115, the integrator 116, the rotary/static coordinate converter 118, the two-/three-phase converter 120, the current controller 122, the PWM invertor 124, the converter 130, the angular velocity estimator 200, the test operation controller 400, the laundry amount estimator 402 and the switch 404 is identical to that of the corresponding component parts of the fifth embodiment, and therefore will not be described again.

In the actual operation of washing, rinsing and dewatering, as shown in FIG. 9, the three-phase induction motor increases in temperature in accordance with the laundry amount and the operating time. With the increase in temperature, the primary resistor $R_1$ (resistance of the stator winding) and the secondary resistor $R_2$ (resistance of the rotor winding) change to an extent dependent on temperature. In accordance with the laundry amount estimated by the laundry amount estimator 402, the resistance value curve selector 500 selects a resistance increase curve set by previous measurement and stored in a ROM included in the resistance value curve selector 500. The operation time of the motor is measured by the timer 502. The primary resistor $R_1$ and the secondary resistor $R_2$ are derived at the particular time point by the resistance value compensator 504, thereby changing the constants used in the slip frequency calculator 112 and the angular velocity estimator 200. As a result, it is possible to suppress the effect of variations in the primary and secondary resistance values due to the temperature increase during the operation, thereby making it possible to secure an always optimum laundry condition.

The temperature variations are more caused by the operation time than by the amount of laundry. It is therefore also effective to change the primary resistor $R_1$ and the secondary resistor $R_2$ based only on the operation time of the three-phase induction motor without taking the laundry amount into consideration.

Eighth Embodiment

Figure 10:
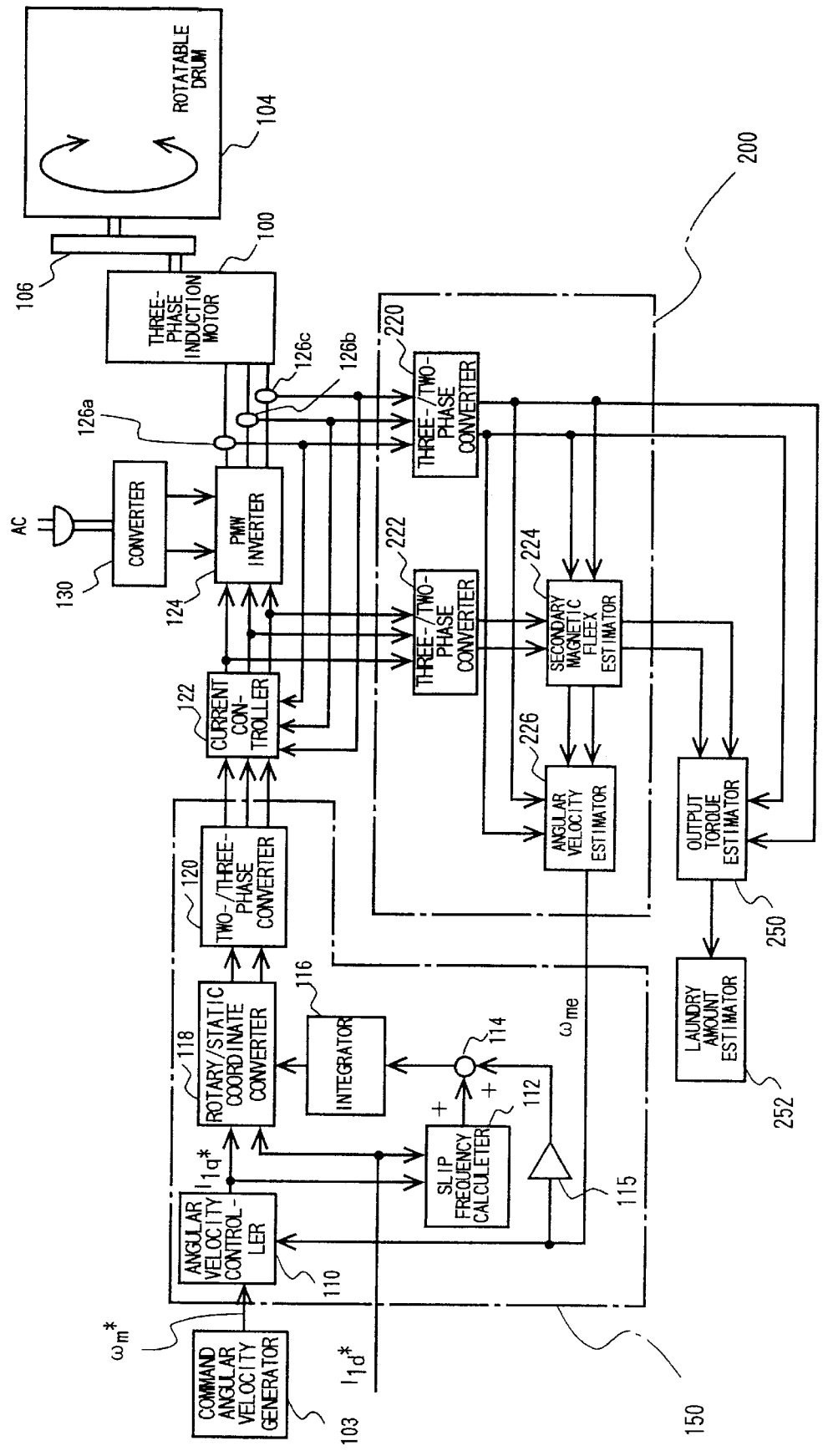
FIG. 10 is a block diagram showing a configuration of a washing machine according to an eighth embodiment of the invention.

FIG. 10 is a block diagram showing a configuration of the washing machine using a three-phase induction motor according to an eighth embodiment of the invention.

In FIG. 10, the three-phase induction motor 100 is coupled through the transmission mechanism 106 to the rotatable drum 104 which washes, dewaters and dries the laundry. The output terminal of the command angular velocity generator 103 for outputting the command rotational angular velocity $\omega_m^*$ commanding the rotational angular velocity of the three-phase induction motor is connected to the input terminal of the angular velocity controller 110. The output terminal of the angular velocity controller 110 is connected to the respective input terminals of the slip frequency calculator 112 and the rotary/static coordinate converter 118. The other input terminals of the slip frequency calculator 112 and the rotary/static coordinate converter 118 are supplied with the command exciting current $I_{1d}^*$.

The two output terminals of the rotary/static coordinate converter 118 are connected to the two input terminals of the two-/three-phase converter 120, respectively. The three output terminals of the two-/three-phase converter 120 are connected to the three input terminals of the current controller 122, respectively. The three output terminals of the current controller 122 are connected to the three input terminals of the PWM invertor 124, respectively. The three output terminals of the PWM invertor 124 are connected to the three-phase induction motor 100, respectively. The two input terminals of the PWM invertor 124 are connected through the converter 130 to an AC power supply.

The three connection lines between the PWM invertor 124 and the three-phase induction motor 100 are provided with the current detectors 126a, 126b, 126c, respectively. The output terminals of the current detectors 126a, 126b, 126c are connected to the three input terminals of the three-/two-phase converter 220, respectively. The two output terminals of the three-/two-phase converter 220 are connected to a secondary magnetic flux estimator 224, an angular velocity estimator 226 and an output torque estimator 250. The three output terminals of the current controller 122 are also connected to the input terminals of the three-/two-phase converter 222. The two output terminals of the three-/two-phase converter 222 are connected to the secondary magnetic flux estimator 224. The output terminal of the secondary magnetic flux estimator 224 is connected also to the angular velocity estimator 226 and the output torque estimator 250. The output terminal of the angular velocity estimator 226 is connected to the input terminals of the amplifier 115 and the angular velocity controller 110. The output terminal of the output torque estimator 250 is connected to the input terminal of the laundry amount estimator 252.

The output terminal of the amplifier 115 is connected to one of the input terminals of the adder 114. The other input terminal of the adder 114 is connected to the output terminal of the slip frequency calculator 112. The output terminal of the adder 114 is connected to the input terminal of the integrator 116. The output terminal of the integrator 116 is connected to the input terminal of the rotary/static coordinate converter 118.

First, the basic operation of the washing machine configured as described above will be described below with reference to FIG. 10. The laundry in the rotatable drum 104 is washed by rotating the rotatable drum 104 by the three-phase induction motor 100 through the transmission mechanism 106.

First, the operation of an angular velocity control unit 150 will be explained.

As described above, the angular velocity control unit 150 includes the angular velocity controller 110, the slip frequency calculator 112, the adder 114, the amplifier 115, the integrator 116, the rotary/static coordinate converter 118 and the two-/three-phase converter 120. The angular velocity controller 110, like in the angular velocity control of a DC motor, gives a command torque current $I_{1q}^*$ as indicated by equation (9), for example. The command torque current $I_{1q}^*$ is formed from the command rotational angular velocity $\omega_m^*$ of the three-phase induction motor output from the command angular velocity generator 103 and the estimated rotational angular velocity $\omega_{me}$ output from the angular velocity estimator 200 for estimating the rotational angular velocity of the three-phase induction motor described later.

Once the rotational angular velocity is estimated correctly, the controllability equivalent to that of the DC motor can be realized. Since the induction motor has no permanent magnet, a predetermined exciting current for producing a magnetic field equivalent to that produced by a permanent magnet is applied to the exciting coil based on the command exciting current $I_{1d}^*$. The slip frequency calculator 112 calculates the slip angular velocity $\omega_s$ according to equation (3) using the command exciting current $I_{1d}^*$ and the command torque current $I_{1g}^*$.

The product of the actual rotational angular velocity $\omega_m$ obtained at the amplifier 115 and the number p of pole pairs of the three-phase induction motor is added to the slip angular velocity $\omega_s$ at the adder 114. The result of addition is integrated by the integrator 116, thereby producing an electrical phase angle $\theta_o$ given by equation (4).

Further, by use of the rotary/static coordinate converter 118, equation (5) is calculated using the command exciting current $I_{1d}^*$, the command torque current $I_{1q}^*$ and the electrical phase angle $\theta_o$ in the same manner as if in the presence of a permanent magnet magnetized in a predetermined direction.

As a result, the command exciting current $I_{1d}^*$ and the command torque current $I_{1q}^*$ are converted into the primary command AC currents $i_{1d}^*$ and $i_{1q}^*$, respectively, indicating the two-phase currents having 90 degrees of phase difference from each other. Then, the primary command AC currents $i_{1d}^*$, $i_{1q}^*$ are converted into the primary command AC currents $i_{1a}^*$, $i_{1b}^*$, $i_{1c}^*$ indicating the three-phase currents in accordance with equation (6) by the two-/three-phase converter 120.

As far as currents can be supplied according to these command currents, the performance equivalent to that of the DC motor can be realized by the induction motor.

Now, the operation of the current controller 122 will be explained. In the current controller 122, the actual primary AC currents $i_{1a}$, $i_{1b}$, $i_{1c}$ are controlled by feedback in such a manner as to follow the primary command AC currents $i_{1a}^*$, $i_{1b}^*$, $i_{1c}^*$, respectively. For example, the actual primary AC currents are detected by the current detectors 126a, 126b, 126c, and the command voltages $v_{1z}^*$ (z: a, b, c) are output by the calculation according to equation (7).

The PWM invertor 124 turns on/off, through transistors, a DC voltage produced from the commercial power supply by the converter 130 in accordance with the signal of a pulse width based on the command voltage provided from the current controller 122. In this way, the desired voltage is applied to supply a current to the three-phase induction motor 100. By the way, the sum of the primary AC currents $i_{1a}$, $i_{1b}$, $i_{1c}$ of three phases supplied to the three-phase induction motor 100 is zero, i.e., represents the relation shown by equation (8).

In the current detection process, currents of any two of the three phases are detected, and the remaining phase of current can be calculated from the detected two phases of current value. In this way, the primary AC current supplied to the three-phase induction motor can be controlled to equal the desired command value, thereby making it possible to control the rotational angular velocity of the three-phase induction motor to the desired angular velocity.

Next, explanation will be made as to the angular velocity estimator 200 for estimating the rotational angular velocity of the three-phase induction motor. The angular velocity estimator 200, includes a three-/two-phase converter 220, a three-/two-phase converter 222, a secondary magnetic flux estimator 224 and an angular velocity estimator 226. The three-/two-phase converter 220 converts the detection outputs $i_{1a}$, $i_{1b}$, $i_{1c}$ of the current detectors 126a, 126b, 126c into the two-phase AC currents $i_{1d}$, $i_{1q}$ as shown in equation (10). The three-/two-phase converter 222, on the other hand, converts the three-phase command voltages $v_{1z}^*$ (z: a, b, c) into the two-phase AC voltages $v_{1d}$, $v_{1q}$, as shown in equation (11).

From the resulting two-phase AC current and two-phase AC voltage, the secondary magnetic flux estimator 224 makes calculations as shown in equations (12) and (13) thereby to estimate the secondary magnetic fluxes $\psi_{2d}$, $\psi_{2q}$, respectively.

From the fundamental equation (equation 1) for the three-phase induction motor as a two-phase model, the following two equations (14) and (15) are obtained for determining the estimated rotational angular velocity $\omega_{me}$ of the three-phase induction motor.

The denominators of these two equations may sometimes assume zero, in the neighborhood of which the estimation accuracy is low. In the case where the three-phase induction motor is driven, however, the secondary magnetic flux $\psi_{2q}$ constituting the denominator of equation (14) and the secondary magnetic flux $\psi_{2d}$ making up the denominator of equation (15) take the form of sinusoidal waves 90 degree out of phase from each other. Therefore, both of them never assume zero at the same time. In view of this, the angular velocity estimator 226 checks the size of the secondary magnetic fluxes $\psi_{2d}$, $\psi_{2q}$, and selects the estimation equation (14) or (15), whichever has a denominator farther from zero than the other. Then, the rotational angular velocity of the three-phase induction motor can be always accurately estimated. In this way, the angular velocity of the three-phase induction motor can be controlled without using the angular velocity detector, and the operation conforming with the command angular velocity can thus be realized.

A method of estimating the laundry amount in the rotatable drum 104 of a washing machine performing the above-mentioned operation will be explained below. The output torque τ of the three-phase induction motor can be expressed by equation (25) using the two-phase AC currents $i_{1d}$, $i_{1q}$ and the secondary magnetic fluxes $\psi_{2d}$, $\psi_{2q}$.

$$\tau = \frac{p \cdot M \cdot (i_{1q} \cdot \psi_{2d} - i_{1d} \cdot \psi_{2q})}{L_2} \tag{25}$$

The output torque estimator 250 can calculate the output torque τ of the three-phase induction motor in accordance with equation (25). Also, the relation between the output torque of the three-phase induction motor and the rotational operation of the rotatable drum with the laundry placed therein is given by equation (26) below.

$$(J + J_L) = \cdot \frac{d}{dt}\omega_m + d_1 = \tau/r^2 \tag{26}$$

where J is the moment of inertia of the rotatable drum, $J_L$ is the moment of inertia of the laundry, $d_1$ is the disturbance such as friction, and r is the reduction ratio between the rotary shaft of the three-phase induction motor and the rotary shaft of the rotatable drum. In the process, when the angular acceleration A of the three-phase induction motor is constant, as shown in equation (27), the amount of laundry is constant. Then, the output torque τ of the three-phase induction motor becomes constant.

$$\frac{d}{dt}\omega_m = A \quad (A: \text{constant}) \tag{27}$$

Figure 11A:
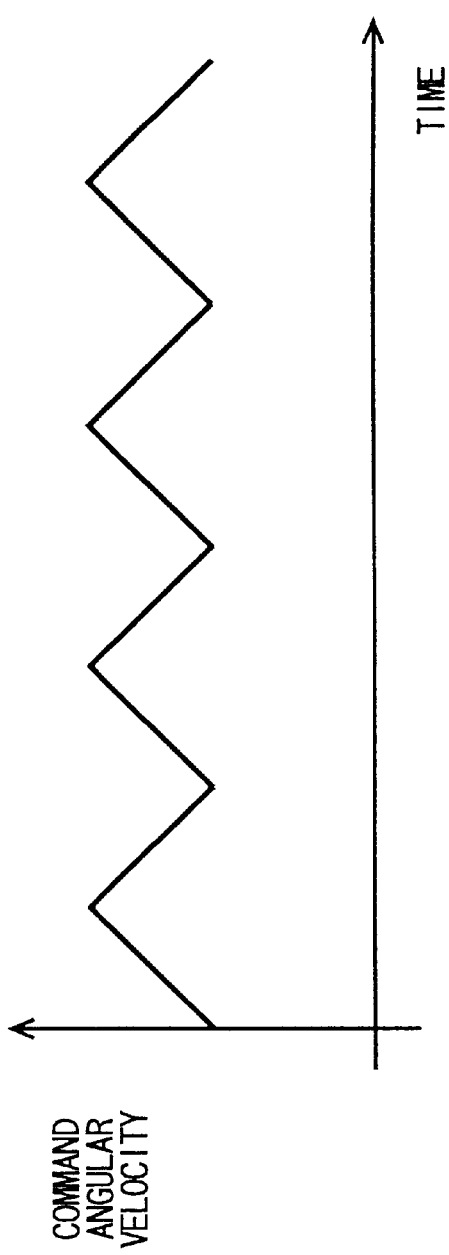
FIG. 11A is a waveform diagram showing the command rotational angular velocity at the time of estimating the laundry amount.
Figure 11B:
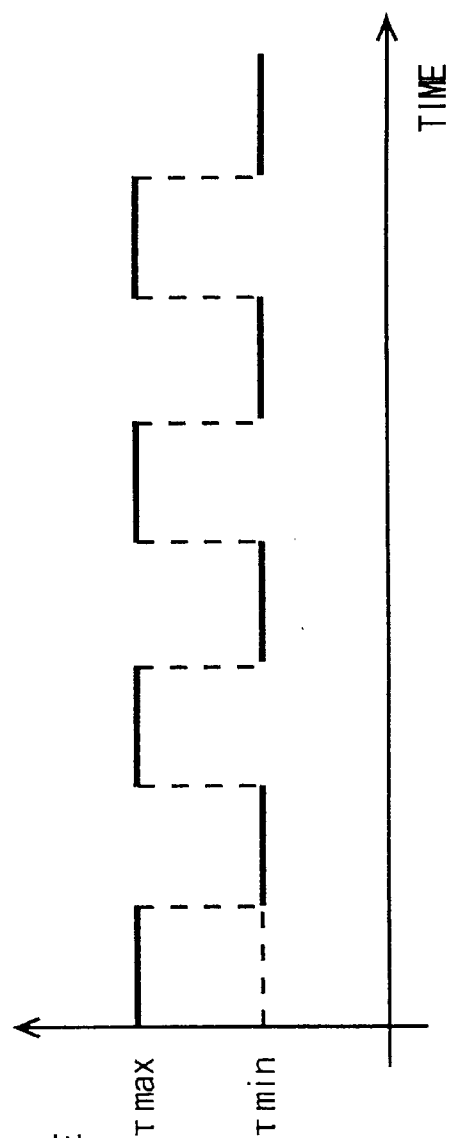
FIG. 11B is a waveform diagram showing the rotational output torque at the time of estimating the laundry amount.

Equation (26) shows that a change in the amount of laundry changes the output torque τ of the three-phase induction motor accordingly. The command rotational angular velocity of the three-phase induction motor output from the command angular velocity generator 103 is given in the form of a triangular wave as shown in FIG. 11(*a*). Consequently, the output torque is produced as a constant value in the time period of a constant angular acceleration as shown in FIG. 11(*b*). The estimation accuracy is improved if the minimum rotational angular velocity indicated by the triangular wave is set lower than the lowest angular velocity at which the laundry closely attaches to the rotatable drum.

Also, in order to improve the estimation accuracy by avoiding the effect of the disturbance $d_1$ such as friction, it is preferable to derive a torque difference between acceleration and deceleration. The angular acceleration in acceleration is represented by A and the angular acceleration in deceleration is represented by −A based on the command rotational angular velocity of a triangular wave. The difference Δτ is determined between the maximum torque τmax in acceleration and the minimum torque τmin in deceleration. Then, the effect of the disturbance $d_1$ can be eliminated. This state is shown in equation (28).

$$2 \cdot (J + J_L)A = \Delta\tau/r^2 \tag{28}$$

Figure 12:
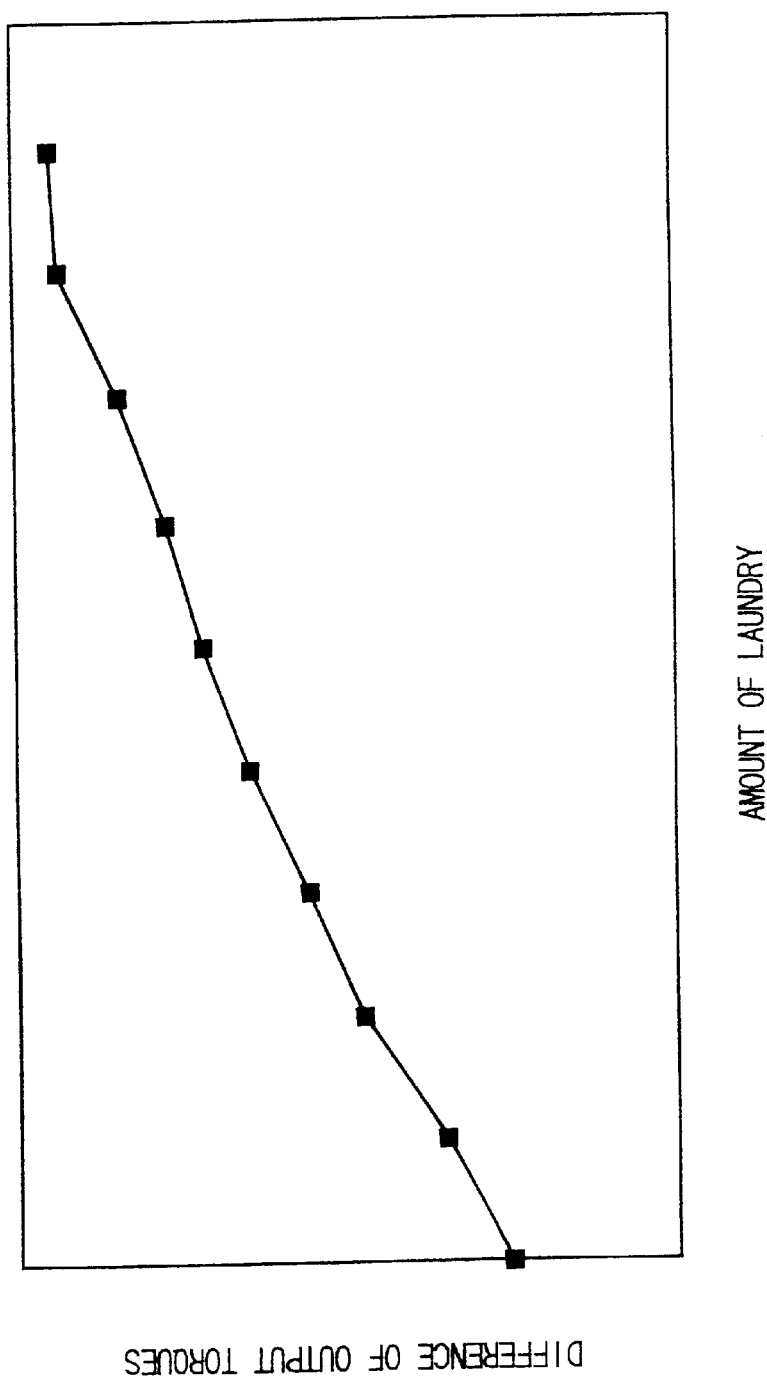
FIG. 12 is a graph showing the relation between the laundry amount and the output torque difference.

Equation (28) shows that the amount of laundry can be estimated from the output torque. The relation between the difference of the output torques and the amount of laundry is shown in FIG. 12. Based on the output of the output torque estimator 250, therefore, the laundry amount estimator 252 can estimate the amount of laundry easily and accurately. In the case where the exciting current component and the torque current component are independently commanded in the three-phase induction motor as according to the present embodiment, the amount of laundry can be estimated also from the value of the torque current component such as the command torque current $I_{1q}^*$ without using the output torque estimator 250 for estimating the output torque of the three-phase induction motor.

Further, in the calculation of equation (11) in the eighth embodiment, since the command voltages $v_{1z}^*$ (z: a, b, c) are used in place of an actual voltage, this avoids the need for a voltage detector. In this case, if the effect of the time delay or the like at the time of turning on the PWM invertor 124 is compensated, the voltage accuracy is improved. In the eighth embodiment, an angular velocity is commanded so as to maintain a constant angular acceleration in the rotation of the three-phase induction motor, and the laundry amount is estimated from the associated output torque. However, in the next embodiment, the laundry amount can alternatively be estimated from the rotational angular velocity by controlling the output torque to a constant level.

Ninth Embodiment

In a ninth embodiment of the present invention, a washing machine includes a laundry amount estimator for estimating the amount of laundry from the rotational angular velocity by controlling the output torque to a constant level. The washing machine according to the ninth embodiment is described with reference to FIG. 13.

Figure 13:
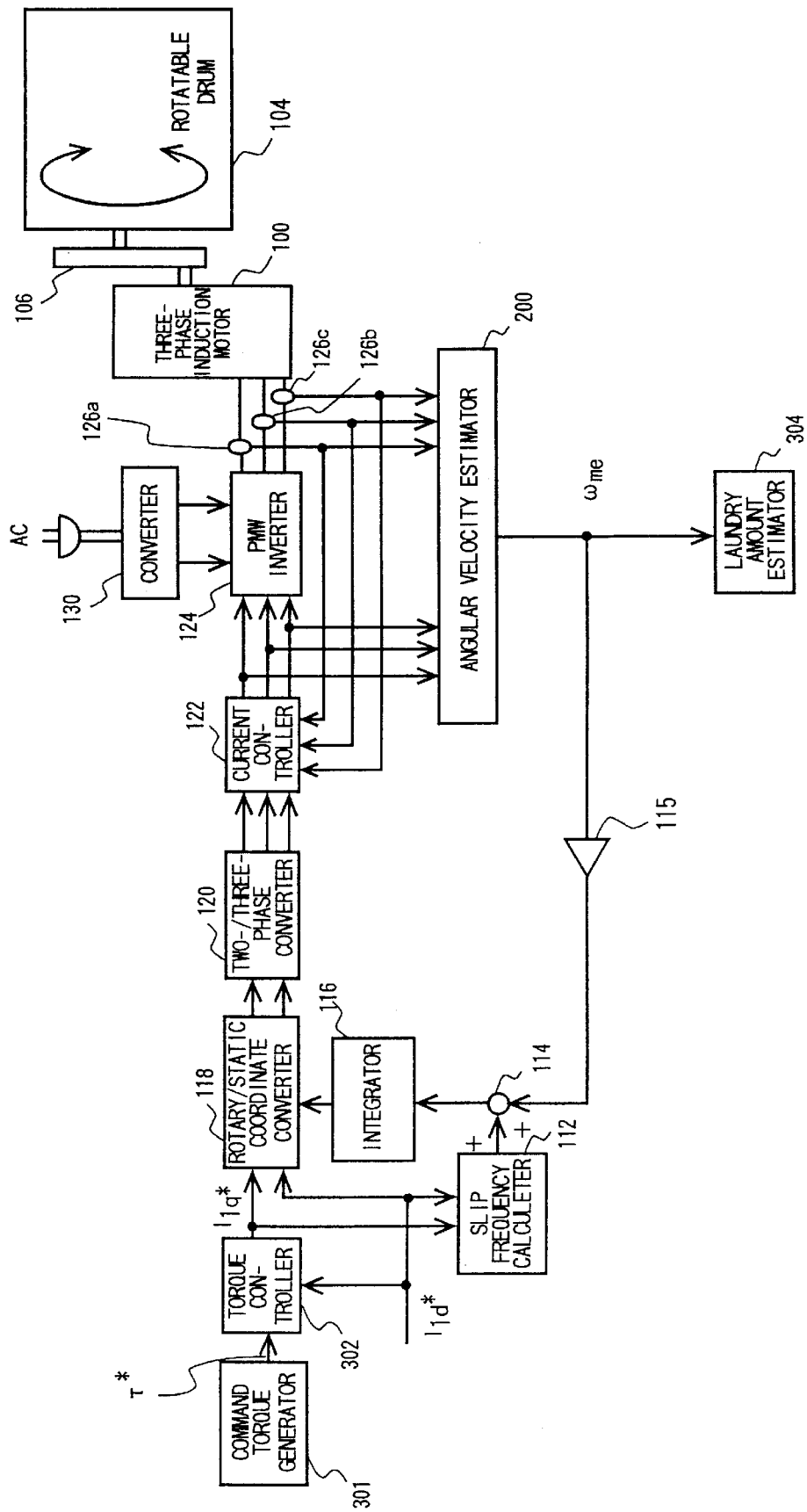
FIG. 13 is a block diagram showing a configuration of a washing machine according to a ninth embodiment of the invention.

FIG. 13 is a block diagram showing a configuration of a washing machine according to the ninth embodiment of the invention. In FIG. 13, the three-phase induction motor 100 is coupled through the transmission mechanism 106 to the rotatable drum 104 for washing, dewatering and drying the laundry. The output terminal of a command torque generator 301 is connected to one of the input terminals of the torque controller 302. The command torque generated 301 outputs a command torque τ* for commanding the output torque of the three-phase induction motor. The other input terminal of the torque controller 302 and one of the input terminals of the slip frequency calculator 112 and the rotary/static coordinate converter 118 are supplied with the command exciting current $I_{1d}^*$.

The output terminal of the torque controller 302 is connected to the other input terminal of the slip frequency calculator 112 and the rotary/static coordinate converter 118. The two output terminals of the rotary/static coordinate converter 118 are connected to the two input terminals of the two-/three-phase converter 120, respectively. The three output terminals of the two-/three-phase converter 120 are connected to the three input terminals of the current controller 122, respectively. The three output terminals of the current controller 122 are connected to the three input terminals of the PWM invertor 124, respectively. The three output terminals of the PWM invertor 124 are connected to the three-phase induction motor 100. The two input terminals of the PWM invertor 124 are connected to an AC power supply through the converter 130.

The three connection lines between the PWM invertor 124 and the three-phase induction motor 100 are provided with the current detectors 126a, 126b, 126c, respectively. The output terminals of the current detectors 126a, 126b, 126c, are connected to the current controller 122, and also to the angular velocity estimator 200. The three output terminals of the current controller 122 are also connected to the angular velocity estimator 200, and the output of the angular velocity estimator 200 is connected to the input terminals of the amplifier 115 and the laundry amount estimator 304.

The output terminal of the amplifier 115 is connected to one of the input terminals of the adder 114, and the other input terminal of the adder 114 is connected to the output terminal of the slip frequency calculator 112. The output terminal of the adder 114 is connected to the input terminal of the integrator 116. The output terminal of the integrator 116 is connected to the input terminal of the rotary/static coordinate converter 118.

The operation of the washing machine configured as described above will be explained with reference to FIG. 13. Also in this embodiment, like in the eighth embodiment, the laundry is washed by rotating the rotatable drum 104 by the three-phase induction motor 100 through the transmission mechanism 106. The operation of the slip frequency calculator 112, the adder 114, the amplifier 115, the integrator 116, the rotary/static coordinate converter 118, the two-/three-phase converter 120, the current controller 122, the PWM invertor 124, the converter 130 and the angular velocity estimator 200 is the same as that of the corresponding component parts in the eighth embodiment.

In this embodiment, a command torque generator 301 is comprised in place of the command angular velocity generator 103 of the eighth embodiment, and a torque controller 302 in place of the angular velocity controller 116. The operation of torque control will be explained. In the case where the actual current substantially coincides with the command current under current control, the output torque $\tau$ of the three-phase induction motor is represented by equation 29. Equation (25) can be transformed into equation (29) using the command exciting current $I_{1d}^*$ and the command torque current $I_{1q}^*$.

$$\tau = \frac{p \cdot M^2 \cdot (I_{1d}^* \cdot I_{1q}^*)}{L_2} \quad (29)$$

A command torque is output from the command torque generator 301, and in accordance with equation (29), the torque controller 302 generates the command torque current $I_{1q}^*$. The current controller 122 controls the current in compliance with the torque command current $I_{1d}^*$ and thus makes it possible to output the desired output torque.

Hereafter, an explanation will be given of a method of estimating the laundry amount in the rotatable drum 104 of the washing machine operating as described above. The relation between the output torque $\tau$ of the three-phase induction motor and the rotation of the rotatable drum 104 with laundry placed therein is given by equation (26) as in the eighth embodiment. Upon application of a constant torque, therefore, the three-phase induction motor runs with isometric acceleration. Then, a command torque of a predetermined value is output from the command torque generator 301, and the corresponding rotational angular velocity of the three-phase induction motor is detected by the angular velocity estimator 200. Next, the change in rotational angular velocity is checked by the laundry amount estimator 304 thereby to estimate the amount of laundry.

In order to eliminate the effect of the disturbance $d_1$ such as friction in equation (26) and to improve the estimation accuracy, a rectangular wave command torque is output and the angular velocity difference is taken between maximum angular velocity and minimum angular velocity. Consequently, the effect of the disturbance $d_1$ can be eliminated. Alternatively, the amount of laundry can be estimated from the time required to reach a predetermined reference angular velocity from another predetermined reference angular velocity.

In the example of a washing machine described above, the laundry closely attaches to the inner surface of the rotatable drum 104 due to the centrifugal force exerted in the dewatering process. The uneven distribution of the laundry attached to the inner wall leads to occurrence of a large vibration of the rotatable drum 104. As a tenth embodiment of the invention, therefore, a washing machine will be explained which includes an unbalanced amount estimator for estimating the unbalanced amount due to the uneven distribution of laundry.

Tenth Embodiment

A washing machine according to a tenth embodiment of the invention will be explained with reference to FIGS. 14 to 17.

Figure 14:
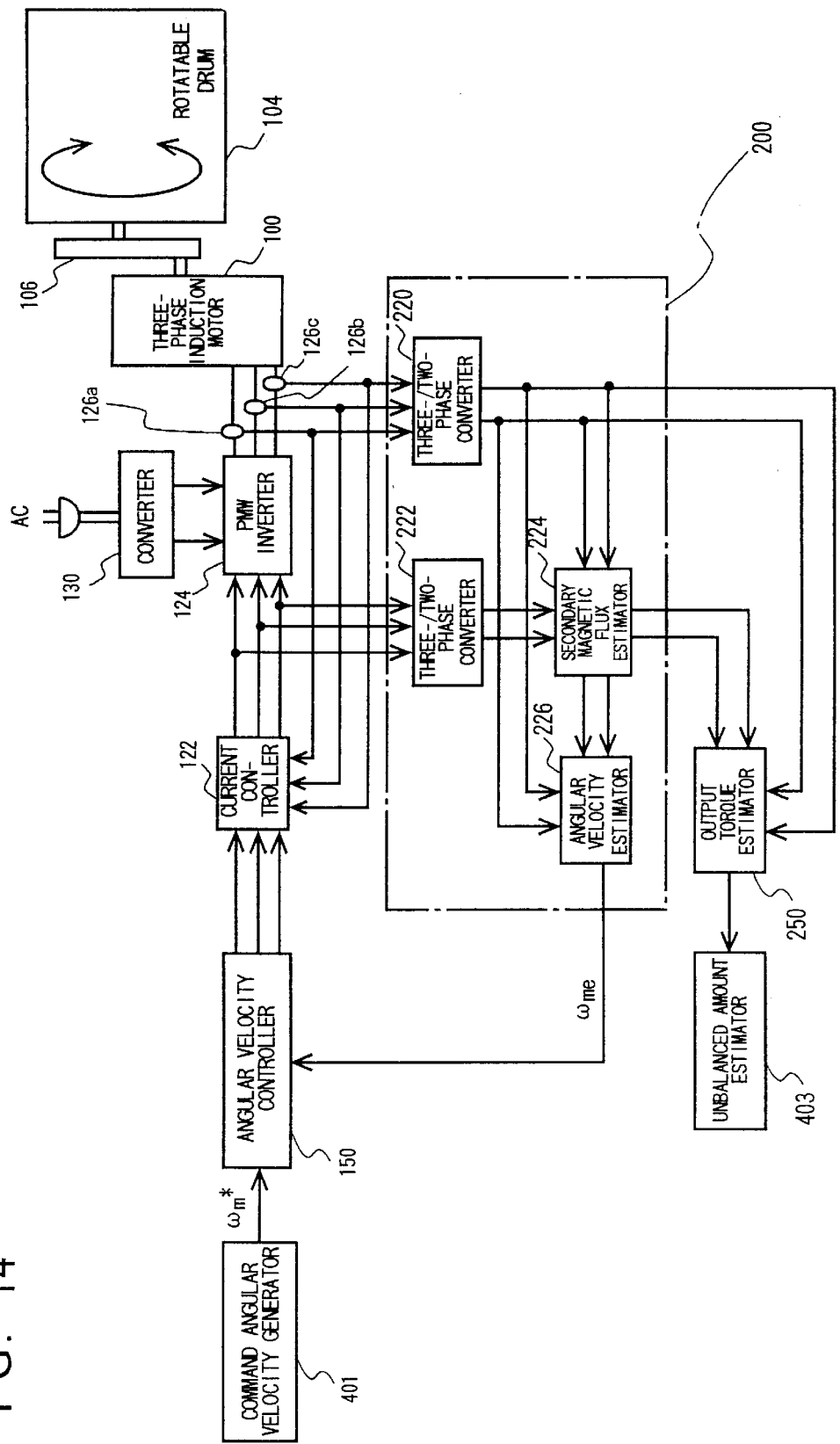
FIG. 14 is a block diagram showing a configuration of a washing machine according to a tenth embodiment of the invention.

FIG. 14 is a block diagram showing a configuration of a washing machine according to the tenth embodiment of the invention.

In FIG. 14, the three-phase induction motor 100 is coupled through the transmission mechanism 106 to the rotatable drum 104 for washing, dewatering and drying the laundry. The output terminal of a command angular velocity generator 401 for outputting the command rotational angular velocity $\omega_m^*$ commanding the rotational angular velocity of the three-phase induction motor is connected to one of the input terminals of the angular velocity controller 150. The three output terminals of the angular velocity controller 150 are connected to the three input terminals of the current controller 122, respectively. The three output terminals of the current controller 122 are connected to the three input terminals of the PWM invertor 124, respectively. The three output terminals of the PWM invertor 124 are connected to the three-phase induction motor 100. The two input terminals of the PWM invertor 124 are connected through the converter 130 to an AC power supply.

The three connection lines between the PWM invertor 124 and the three-phase induction motor 100 are provided with the current detectors 126a, 126b, 126c, respectively. The output terminals of the current detectors 126a, 126b, 126c are connected to three input terminals of the current controller 122, respectively. The output terminals of the current detectors 126a, 126b, 126c are also connected to the three input terminals of the three-/two-phase converter 220, respectively. The two output terminals of the three-/two-phase converter 220 are connected to the secondary magnetic flux estimator 224 on the one hand and to the angular velocity estimator 226 and the output torque estimator 250 on the other hand.

The three output terminals of the current controller 122, on the other hand, are also connected to three input terminals of the three-/two-phase converter 222, respectively. The two output terminals of the three-/two-phase converter 222 are connected to the secondary magnetic flux estimator 224. The output terminals of the secondary magnetic flux estimator 224 are connected also to the angular velocity estimator 226 and the output torque estimator 250. The output terminal of the angular velocity estimator 226 is connected to the other input terminal of the angular velocity controller 150. The output terminal of the output torque estimator 250 is connected to the input terminal of an unbalanced amount estimator 403.

The operation of the washing machine configured as described above will be described with reference to FIG. 14. According to this embodiment, like in the eighth embodiment, the rotatable drum 104 is rotated through the transmission mechanism 106 by the three-phase induction motor 100 to wash the laundry. The operation of the angular velocity controller 150, the current controller 122, the PWM invertor 124, the converter 130, the angular velocity estimator 200 and the output torque estimator 250 is the same as that of the corresponding component parts of the eighth embodiment, and therefore will not be described again.

Figure 15:
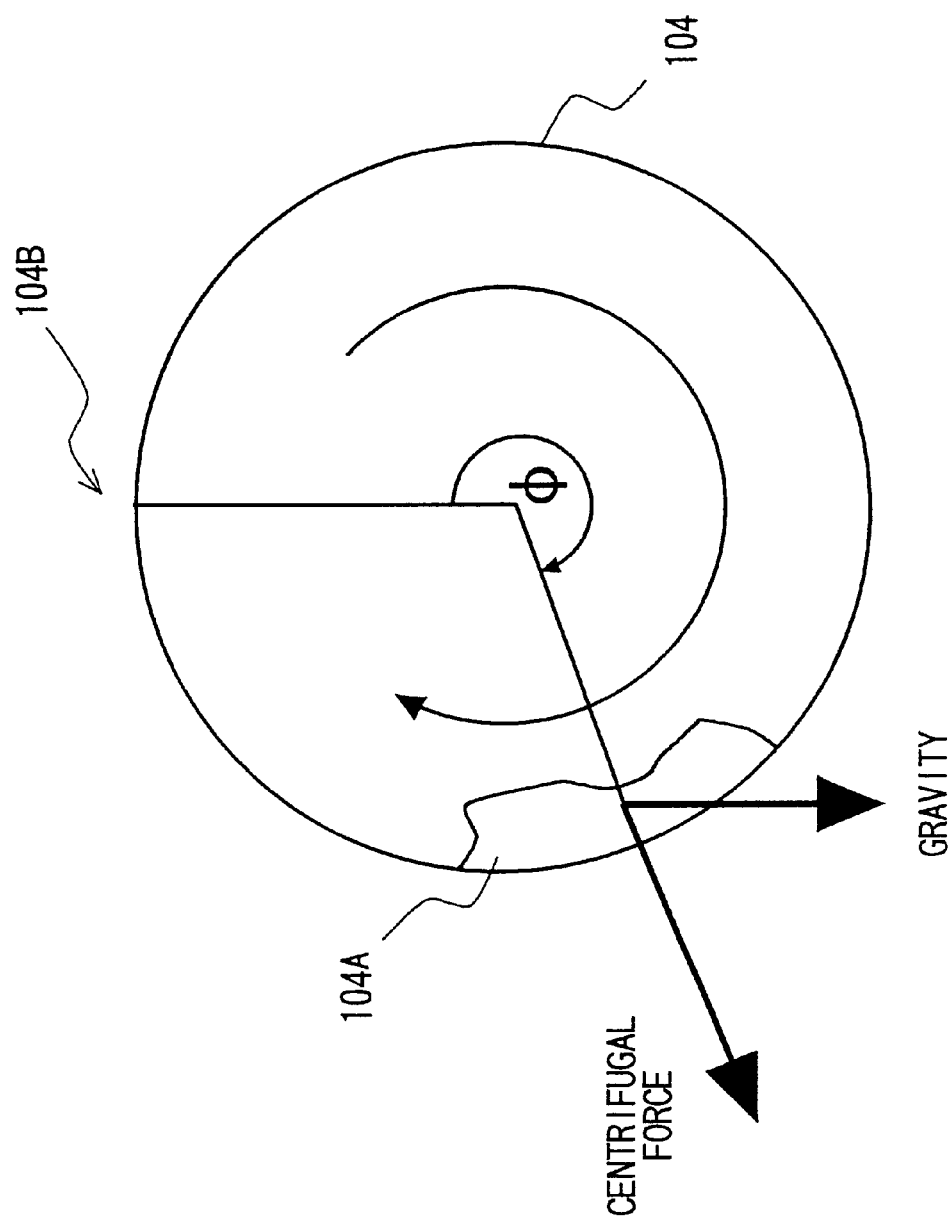
FIG. 15 is a front view showing an unbalanced state of the rotatable drum.
Figure 16:
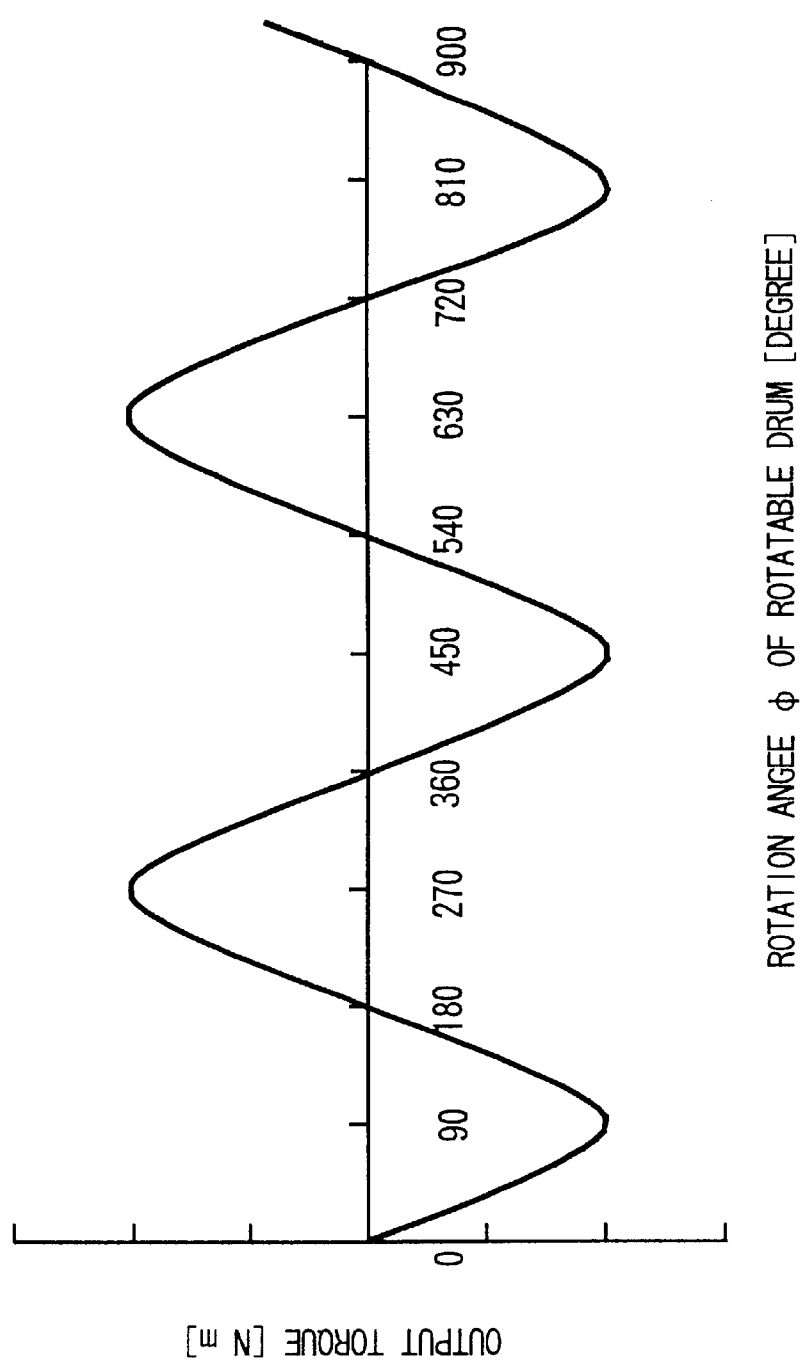
FIG. 16 is a waveform diagram showing the output torque in the unbalanced state of the rotatable drum.

Mainly at the time of dewatering, the laundry attaches closely to the inner surface of the rotatable drum 104 due to the centrifugal force. First, explanation will be given of the unbalanced state caused by the uneven distribution of laundry closely attached so. FIG. 15 is a front view of the rotatable drum 104. As shown in FIG. 15, when the laundry 104A unevenly, closely attaches to the inner surface of the rotatable drum 104, the centrifugal force due to and the gravity of the laundry 104A are exerted on the rotatable drum 104. Especially, the centrifugal force increase with the rotational angular velocity of the rotatable drum 104 to such an extent as to cause a great vibration. Therefore, it is necessary to detect an unbalanced state before the rotational angular velocity increases after the rotatable drum 104 starts rotating at the time of dewatering or the like. Assuming that the clockwise rotation of the rotatable drum 104, i.e. the three-phase induction motor is the forward direction, and that the position of the unevenly distributed laundry 104A in the rotatable drum 104 is represented by an angle $\phi$, the equation of motion is given by equation (30).

$$(J + J_L) \cdot \frac{d^2}{dt^2}\phi + d_2 - mg \cdot R \cdot \sin(\phi) = \tau/r \quad (30)$$

where J is the moment of inertia of the rotatable drum 104, $J_L$ is the moment of inertia of the laundry 104A, m is the unbalanced amount expressed in terms of mass of the unevenly distributed laundry 104A, g is the acceleration of gravity, R is the radius of the rotatable drum, $d_2$ is the disturbance such as friction, and r is the reduction ratio between the rotary shaft of the three-phase induction motor and the rotary shaft of the rotatable drum. When the command angular velocity generator 401 issues a predetermined command rotational angular velocity equal to or more than the rotational angular velocity at which the laundry 104A closely attaches to the inner surface of the rotatable drum 104 under the centrifugal force, the output torque generated by the three-phase induction motor changes as shown in FIG. 16. In the process, the variation range $\Delta \tau$ of the difference between maximum torque and minimum torque generated by the three-phase induction motor is derived. Consequently, in equation (30), the terms of moment of inertia and disturbances are deleted, and the following equation (31) becomes effective.

$$\Delta \tau = 2 \cdot mg \cdot R \cdot r \quad (31)$$

Figure 17:
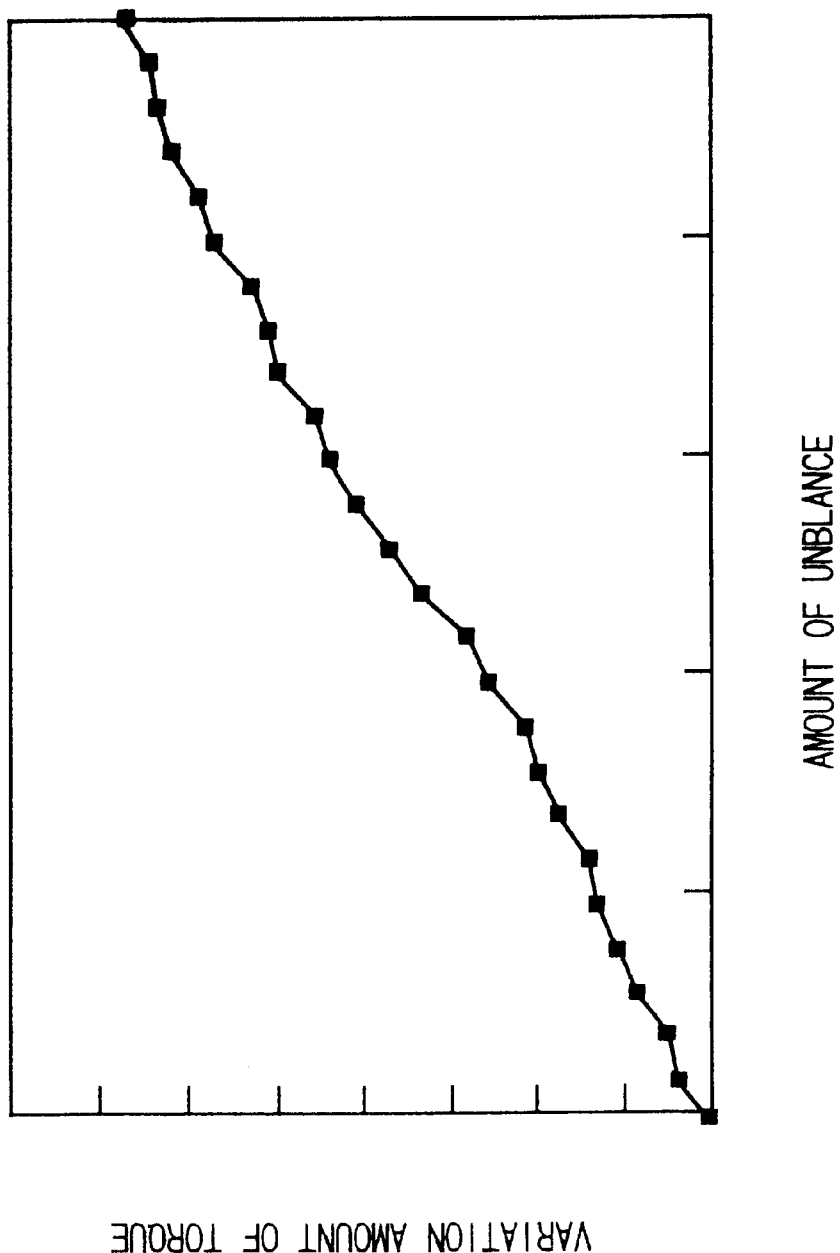
FIG. 17 is a graph showing the relation between the unbalanced amount and the torque variation.

An example of relation between the unbalanced amount and a variation amount of torque is shown in FIG. 17. FIG. 17 shows that the unbalanced amount can be easily estimated from the variation amount of torque. In this way, the output torque $\tau$ of the three-phase induction motor can be estimated by the output torque estimator 250, while the three-phase induction motor is rotating at a predetermined rotational angular velocity following the command angular velocity $\omega_m{}^*$ specified by the command angular velocity generator 401. Next, the difference between maximum torque and minimum torque constituting the output of the output torque estimator 250 is taken by the unbalanced amount estimator 403. By thus using the relation of FIG. 17, the unbalanced amount can be easily and accurately determined.

In this way, the unbalanced amount can be measured before dewatering the laundry. In the case where the unbalanced amount increases beyond a predetermined amount, the dewatering operation can be suspended and resumed. Therefore, a large vibration can be prevented.

In the case where the exciting current component and the torque current component are commanded independently of each other by use of the three-phase induction motor as in this embodiment, the amount of laundry can be estimated from the torque current component such as the command torque current $I_{1q}{}^*$ without using the output torque estimator 250 for estimating the output torque of the three-phase induction motor.

Also, in conducting the estimation operation, the rotational angular velocity of the rotatable drum 104 is preferably selected to an angular velocity higher than the rotational angular velocity at which laundry attaches closely to the rotatable drum due to the centrifugal force, and lower than the rotational angular velocity at which the rotatable drum develops the primary resonance. This rotational angular velocity, though dependent on the structure of the washing machine, is 70 to 300 revolutions per minute for the normal rotatable drum 104.

In the above-mentioned configuration, when the estimated unbalanced amount is larger than a predetermined value, the dewatering operation is suspended and the whole operation restarted. In this way, large vibrations can be prevented.

Now, explanation will be given below of a washing machine having the function of preventing the rotatable drum from easily losing the balance as an 11th embodiment of the invention.

11th Embodiment

Figure 18:
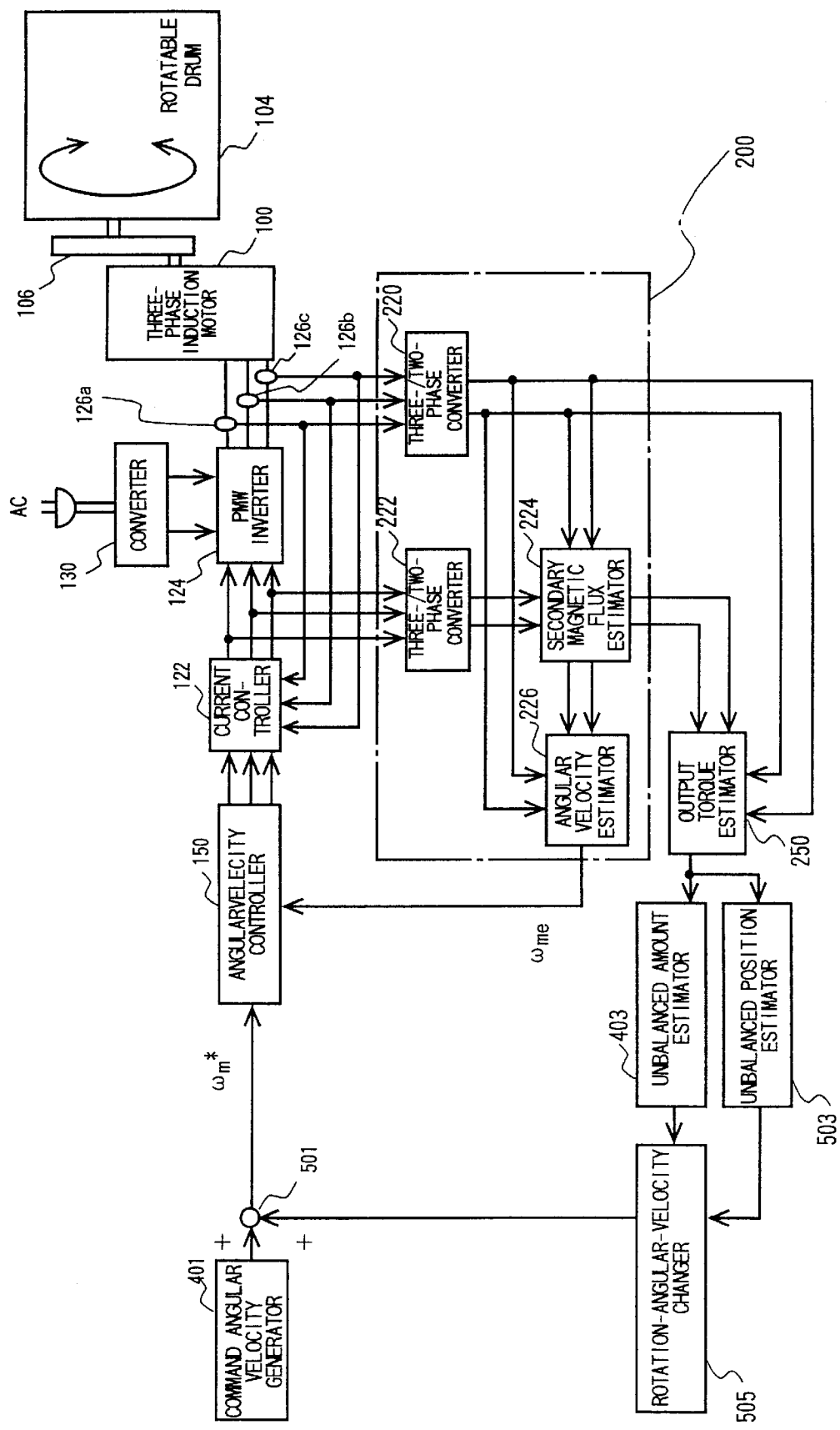
FIG. 18 is a block diagram showing a configuration of a washing machine according to an eleventh embodiment of the invention.

A washing machine according to an 11th embodiment of the invention will be explained with reference to FIG. 18. FIG. 18 is a block diagram showing a configuration of a washing machine according to the 11th embodiment of the invention.

In FIG. 18, the three-phase induction motor 100 is coupled through the transmission mechanism 106 to the rotatable drum 104 for washing, dewatering and drying the laundry. The output terminal of the command angular velocity generator 401 for outputting the command rotational angular velocity $\omega_m{}^*$ is connected to one of the input terminals of the adder 501. The output terminal of the adder 501 is connected to one of the input terminals of the angular velocity controller 150. The three output terminals of the angular velocity controller 150 are connected to the three input terminals, respectively, of the current controller 122. The three output terminals of the current controller 122 are connected to the three input terminals of the PWM invertor 124, respectively, and the three output terminals of the PWM invertor 124 are connected to the three-phase induction motor 100. The two input terminals of the PWM invertor 124 are connected to an AC power supply through the converter 130.

The three connection lines between the PWM invertor 124 and the three-phase induction motor 100 are provided with the current detectors 126*a*, 126*b*, 126*c*, respectively. The output terminals of these current detectors 126*a*, 126*b*, 126*c* are connected to the current controller 122. The output terminals of the current detectors 126*a*, 126*b*, 126*c* are connected also to the three input terminals of the three-/two-phase converter 220, respectively. The two output terminals of the three-/two-phase converter 220 are connected to the secondary magnetic flux estimator 224 on the one hand and to the angular velocity estimator 226 and the output torque estimator 250 on the other hand.

The three output terminals of the current controller 122 are also connected to the three input terminals of the three-/two-phase converter 222, respectively. The two output terminals of the three-/two-phase converter 222 are connected to the secondary magnetic flux estimator 224. The output terminals of the secondary magnetic flux estimator 224 are connected to the input terminals of the angular velocity estimator 226 and the output torque estimator 250. The output terminal of the angular velocity estimator 226 is connected to the other input terminal of the angular velocity controller 150. The output terminal of the output torque estimator 250 is connected to the input terminals of an unbalanced amount estimator 403 and an unbalanced position estimator 503. The output terminals of the unbalanced amount estimator 403 and the unbalanced position estimator 503 are connected to two input terminals of a rotational angular velocity changer 505, respectively. The output terminal of the rotational angular velocity changer 505 is connected to the input terminal of the adder 501.

The operation of a washing machine configured as described above will be explained with reference to FIG. 18. According to this embodiment, too, like in the eighth embodiment, the rotatable drum 104 is rotated through the transmission mechanism 106 by the three-phase induction motor 100 thereby to wash the laundry. The operation of the angular velocity controller 150, the current controller 122, the PWM invertor 124, the converter 130, the angular velocity estimator 200 and the output torque estimator 250 is the same as that of the corresponding component parts of the eighth embodiment. The operation of the unbalanced amount estimator 403 is the same as that of the corresponding component part of the tenth embodiment.

According to the 11th embodiment, it is possible to detect the position of the laundry distributed unevenly by utilizing the method of measuring the magnitude of the unbalanced amount. First, explanation will be made about the operation of the unbalanced position estimator 503 for detecting the unbalanced position.

In FIG. 15, the torque of the three-phase induction motor for rotating the rotatable drum 104 in the unbalanced state assumes a maximum value at an angle φ of 270 degrees and a minimum value at an angle φ of 90 degrees in the drawing. It is therefore possible to detect the position where the laundry 104A closely attaches in the rotatable drum 104 from the maximum or minimum value of the output torque estimated by the output torque estimator 250. This makes it possible to improve the unbalanced state by dropping or displacing the laundry 104A closely attached to the inner surface of the rotatable drum 104 by suddenly changing the rotational angular velocity of the three-phase induction motor in accordance with the detected position.

As an example, when the unbalanced position estimator 503 shows that the laundry 104A causing an unbalance is located at the upper portion 104B of the rotatable drum 104, i.e. the angle φ reaches the neighborhood of zero in FIG. 15, an angular velocity correction value is output from the rotational angular velocity corrector 505 thereby to decelerate the angular velocity of the rotatable drum 104. As a result of deceleration, when the gravity exceeds the centrifugal force exerted on the laundry 104A, the laundry 104A comes off from the inner surface of the rotatable drum 104 and the unbalanced state is obviated.

Another possible method is to suddenly increase or decrease the rotational angular velocity of the rotatable drum 104 and to displace the laundry 104A by taking advantage of the energy of inertia. In this case, too, the position of laundry 104A closely attached unevenly to the inner surface of the rotatable drum 104 can be effectively displaced to correct the unbalanced state taking the relation between the position and gravity of the laundry 104A in unbalanced state into account.

As described above, in the case where the unbalanced amount is larger than a predetermined value, the likelihood of an unbalanced state occurring again is considerably reduced by resuming the dewatering operation suspended to obviate the unbalanced state. This correcting operation is preferably performed in the neighborhood of a lowest rotational angular velocity at which the laundry 104A closely attaches to the inner surface of the rotatable drum 104 due to the centrifugal force in order to minimize the effect of the centrifugal force.

12th Embodiment

Figure 19:
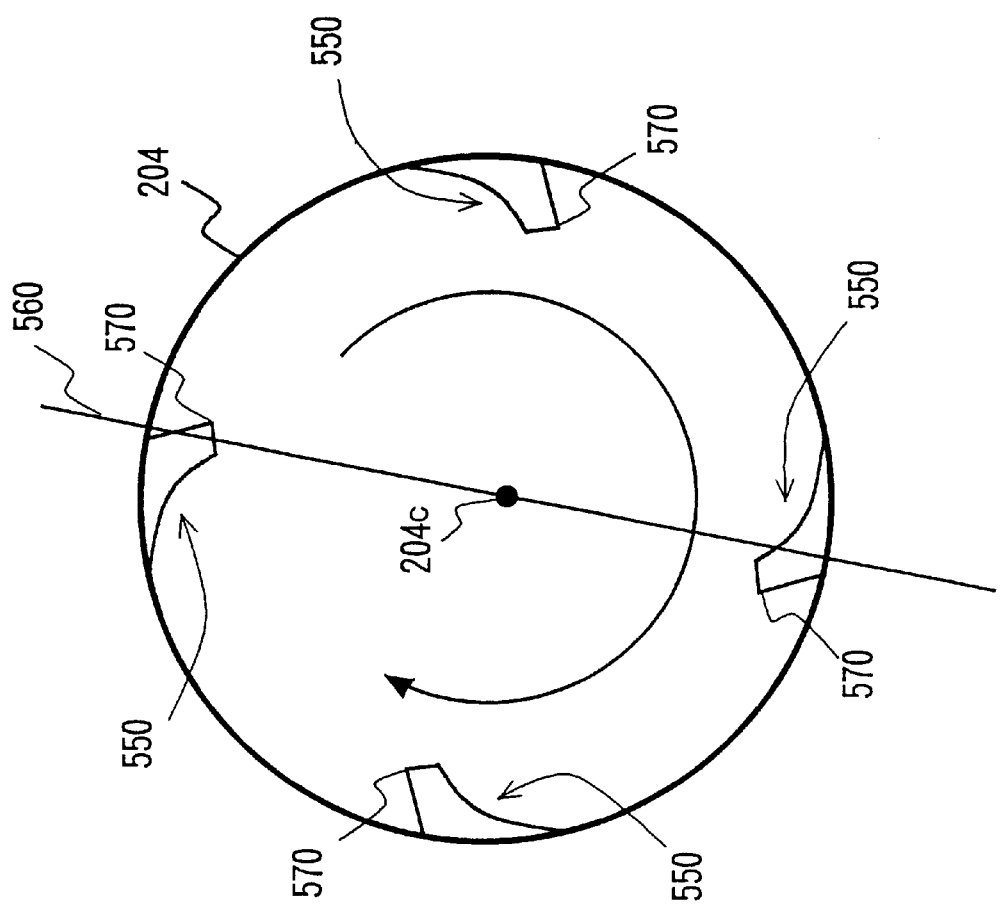
FIG. 19 is a front view showing a configuration of the rotatable drum according to a 12th embodiment of the invention.

As a 12th embodiment of the invention, a washing machine having a rotatable drum which does not develop into the unbalanced state will be explained with reference to FIG. 19. FIG. 19 is a front view of a rotatable drum 204 for explaining the operation of a washing machine according to the 12th embodiment of the invention. In FIG. 19, the rotatable drum 204 for washing, dewatering and drying the laundry has a plurality of protrusions 550 for catching the laundry to be washed on an inner wall thereof.

The operation of the washing machine having the above-mentioned configuration will be explained hereafter. In the washing machine having the rotatable drum 204 rotating about a substantially horizontal axis 204, the rotatable drum 204 is rotated in the direction of arrow for washing the laundry so as to hoist the laundry with the protrusions 550 and drop them at the next moment. At the time of dewatering, in order to avoid the unbalanced state of the rotatable drum 204 due to the uneven distribution of laundry, the laundry preferably attaches closely to the inner surface of the rotatable drum 204 uniformly by centrifugal force.

As shown in FIG. 19, each protrusion 550 has a hook 570 configured rotationally asymmetric about a virtual plane 560 passing the protrusions 550 and the rotational axis 204C. At the time of washing, the rotatable drum 104 is rotated in the direction of arrow in FIG. 19, so that the laundry thus hoisted by the hooks 570 of the protrusions 550 and are dropped from above. At the time of dewatering, on the other hand, a command rotational angular velocity of a negative value is output from the command angular velocity generator 401 of FIG. 18, for example, thereby to rotate the rotatable drum 204 in the direction opposite to the arrow. Then, the laundry is scarcely caught by the hooks 570 at the time of dewatering, and therefore, the rotatable drum 204 is not easily unbalanced.

The above-described configuration makes it possible to realize a washing machine of which the rotatable drum 204 rarely becomes unbalanced.

In view of this, a washing machine having the function of correcting the unbalanced state will be explained below as a 13th embodiment.

13th Embodiment

Figure 20:
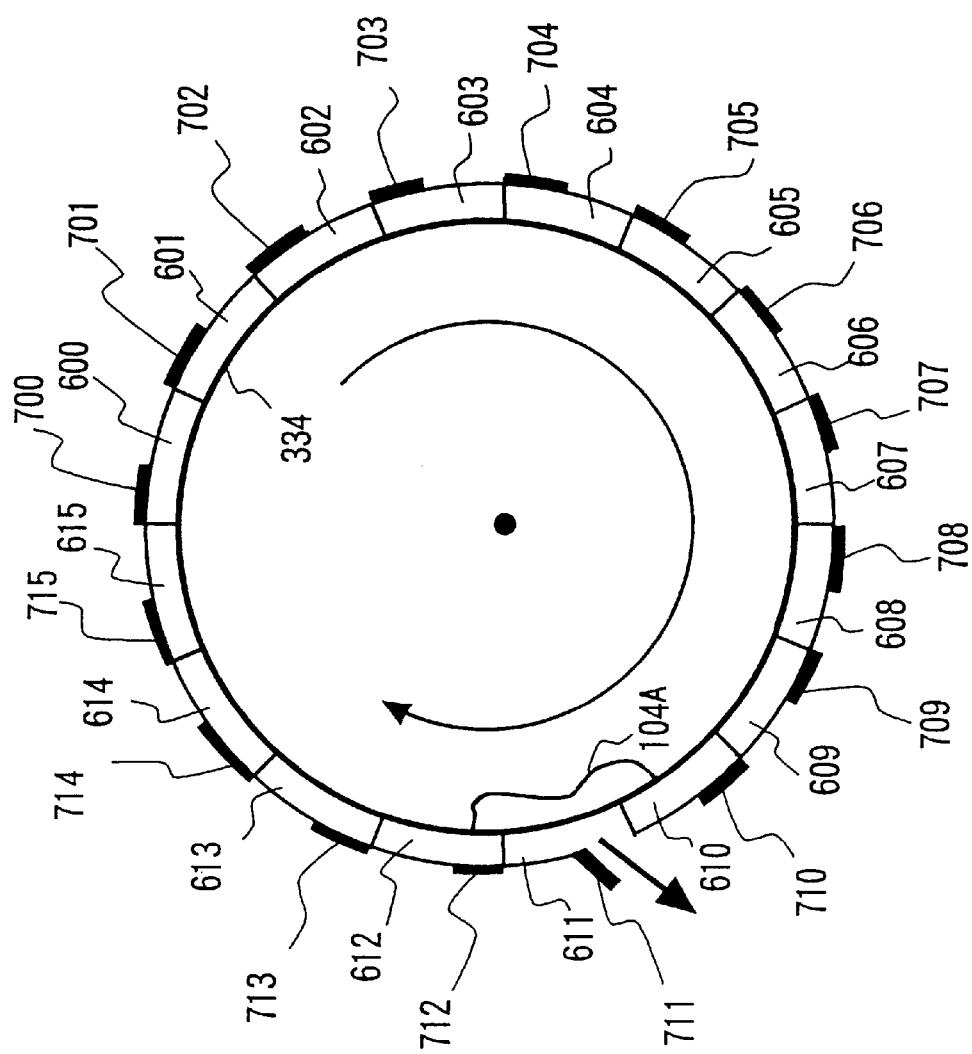
FIG. 20 is a front view showing a configuration of the rotatable drum according to a 13th embodiment of the invention.

A washing machine according to the 13th embodiment of the present invention will be explained with reference to FIG. 20. FIG. 20 is a front view of a rotatable drum 334 of a washing machine according to the 13th embodiment. In FIG. 20, for example, 16 tanks 600 to 615 which can be filled with water are arranged around the rotatable drum 334 for washing, dewatering and drying the laundry. These tanks 600 to 615 rotate together with the rotatable drum 334.

FIG. 21 is a block diagram showing a configuration of the washing machine according to the 13th embodiment. In FIG. 21, the output terminals of an unbalanced amount estimator 403 and an unbalanced position estimator 503 are connected to two input terminals of the unbalanced amount corrector 602, respectively. The output terminal of the unbalanced amount corrector 602 is connected to switches 800 to 815 of electromagnets for selectively activating doors 700 to 715 for opening/closing the openings of the tanks 600 to 615 by extending or retracting the movable pins (not shown) arranged radially outward of each door in parallel to a rotary shaft.

The operation of the washing machine having the above-mentioned configuration will be explained with reference to FIGS. 20 to 21. First, all the tanks 600 to 615 are filled with water in advance. The rotatable drum 334 is rotated, and the unbalanced amount estimator 403 estimates the unbalanced amount of the rotatable drum 334 due to the uneven distribution of the laundry in the same manner as in the tenth embodiment. Further, the unbalanced position estimator 503 estimates the unbalanced position of the laundry in the rotatable drum 334 in the same manner as in the 11th embodiment. The unbalanced amount corrector 602 controls the switch 811 in such a manner as to open the door 711 of the tank 611 in the vicinity of the position of the unevenly distributed laundry 104A estimated by the unbalanced position estimator 503. As the door 711 opens, water is discharged from the tank 61 in accordance with the unbalanced amount estimated by the unbalanced amount estimator 403. As a result, the unbalanced state of the rotatable drum 334 due to the uneven distribution of the laundry 104A can be corrected and the dewatering operation becomes possible without causing a large vibration.

In order to reduce the moment of inertia by reducing the weight of the rotatable drum 334, water is preferably left only in the tank 603 located symmetrically with respect to the unevenly distributed laundry 104A about the rotational center of the rotatable drum 334. In this case, water is discharged from the other tanks 600 to 602, 604 to 615 to correct the unbalance. The unbalanced state of the rotatable drum 334 can be easily corrected by this process.

Each of the above-mentioned embodiments concerns a configuration using a three-phase induction motor. The motor for driving the rotatable drum, however, is not limited to such a configuration but other systems can also be employed. This invention of course is applicable with equal effect especially to a DC motor or a brushless motor of which the torque generated can be easily estimated.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A washing machine comprising:
    a three-phase induction motor for driving a rotatable drum or an agitator mounted in said rotatable drum;
    a controller for independently commanding the torque current component and the exciting current component of primary AC currents supplied to the stator of said three-phase induction motor in accordance with the command rotational angular velocity of said three-phase induction motor and the rotational angular velocity of said three-phase induction motor, and thus changing the magnitude and frequency of each of said primary AC currents thereby to control the rotational angular velocity of said three-phase induction motor; and
    an angular velocity estimator for estimating the rotational angular velocity of said three-phase induction motor based on at least one of the primary AC current and a primary AC voltage supplied to the stator of said three-phase induction motor and constants unique to said three-phase induction motor.

2. The washing machine of claim 1, wherein a command value of said exciting current component is set smaller in a dewatering operation than in a washing operation.

3. The washing machine of claim 1, wherein the command rotational angular velocity is given as a continuous time function undergoing a smooth change.

4. The washing machine of claim 3, wherein the command rotational angular velocity is expressed as a function of third order of time.

5. The washing machine of claim 1, wherein the controller comprises:
    current detectors for measuring each of the primary AC currents supplied to the stator of the three-phase induction motor,
    a current controller for controlling the primary AC currents so that the outputs of the current detectors coincide with corresponding command currents, respectively, and
    a current commander for producing a command current for commanding the magnitude and frequency of each of the primary AC currents by commanding the torque current component and the exciting current component of the primary AC currents independently of one another.

6. The washing machine of claim 5, wherein the controller comprises:
    a test operation controller for conducting a test operation of the three-phase induction motor by commanding as said torque current component the product of the difference between the command rotational angular velocity of said three-phase induction motor and the output value of said angular velocity estimator by a predetermined test operation constant; and
    a laundry amount estimator for estimating the amount of laundry.

7. The washing machine of claim 6, wherein said laundry amount estimator estimates the amount of laundry based on the magnitude of the output of the angular velocity estimator during the test operation.

8. The washing machine of claim 6, wherein the test operation controller conducts plural test operations and said laundry amount estimator estimates the amount of laundry based on the range of variation of the output value of said angular velocity estimator during said plural test operations.

9. The washing machine of claim 6, wherein the test operation controller uses a test operation constant of which the output value of said angular velocity estimator is small as compared with the command rotational angular velocity of the three-phase induction motor, in the case where a test operation is conducted with the laundry in the rotatable drum equal to a maximum tolerance mount in the washing machine.

10. The washing machine of claim 6, wherein the test operation controller test operates the three-phase induction motor by using a command value including a torque current component expressed at least as the product of the integration of the difference between the command rotational angular velocity of the three-phase induction motor and the output value of the angular velocity estimator by a predetermined test operation constant.

11. The washing machine of claim 10, wherein in the case where a test operation is conducted with the laundry of the maximum tolerance amount of the washing machine in the rotatable drum, the test operation controller selects such a test operation constant that the time length from the time point of start of the test operation to the time point when the output of said angular velocity estimator reaches a specified rotational angular velocity is longer than the time length in the case where the washing machine is operated without laundry.

12. The washing machine of claim 10, wherein the test operation controller conducts a test operation of said three-phase induction motor by commanding a predetermined torque current component value.

13. The washing machine of claim 1, wherein the controller comprises a motor constant measurement device for measuring at least one of the constants unique to the three-phase induction motor.

14. The washing machine of claim 13, wherein the motor constant measurement device measures at least one of the constants unique to the three-phase induction motor including the electrical resistance, the self-inductance, and the mutual inductance of the stator winding and the rotor winding at least one of the times of switching on power, supplying water and discharging water.

15. The washing machine of claim 1, wherein the controller comprises a resistance value compensator for correcting at least one of the electrical resistance value of the stator and the electrical resistance value of the rotor of the three-phase induction motor in accordance with the time when the three-phase induction motor is running.

16. The washing machine of claim 1, further comprising a torque constant operation controller for rotating the rotatable drum with the torque current component maintained at a constant value.

17. The washing machine of claim 1, further comprising an unbalanced amount estimator for estimating the unbalanced amount due to the uneven distribution of laundry closely attached to the inner surface of the rotatable drum based on the torque output of the motor.

18. The washing machine of claim 17, further comprising:
a plurality of tanks arranged in said rotatable drum and capable of storing water;
an unbalanced position estimator for estimating the position of laundry closely attached unevenly to the inner surface of said rotatable drum; and
an unbalanced amount corrector for reducing the unbalanced amount by draining the water prestored in the tanks based on the outputs of the unbalanced amount estimator and the unbalanced position estimator.

19. The washing machine of claim 1, further comprising protrusions mounted inside said rotatable drum, said laundry being liable to be caught by said protrusions when the washing machine is rotating in the direction of washing, said laundry being not liable to be caught by said protrusions when the washing machine is rotating in the direction of dewatering.

20. A washing machine comprising:
a three-phase induction motor for driving a rotatable drum or an agitator mounted in said rotatable drum;
a controller including
current detectors for measuring each of primary AC currents supplied to the stator of said three-phase induction motor,
a current controller for controlling said primary AC currents so that the outputs of said current detectors coincide with corresponding command currents, respectively, and
a current commander for producing a command current for commanding the magnitude and frequency of each of said primary AC currents by commanding the torque current component and the exciting current component of said primary AC currents independently of each other,
said primary AC currents being changed in accordance with the command rotational angular velocity of said three-phase induction motor and the rotational angular velocity of said three-phase induction motor thereby to control the rotational angular velocity of said three-phase induction motor; and
an angular velocity estimator for estimating the rotational angular velocity of said three-phase induction motor based on the output of said current detectors and constants unique to said three-phase induction motor.

21. The washing machine of claim 20, wherein the controller comprises:
a test operation controller for conducting a test operation of the three-phase induction motor by commanding as the torque current component the product of the difference between the command rotational angular velocity of said three-phase induction motor and the output value of said angular velocity estimator by a predetermined test operation constant; and
a laundry amount estimator for estimating the amount of laundry based on the output value of said angular velocity estimator during said test operation.

22. The washing machine of claim 21, wherein said laundry amount estimator estimates the amount of laundry based on the magnitude of the output of the angular velocity estimator during the test operation.

23. The washing machine of claim 21, wherein the test operation controller conducts plural test operations and said laundry amount estimator estimates the amount of laundry based on the range of variation of the output value of said angular velocity estimator during said plural test operations.

24. The washing machine of claim 21, wherein the test operation controller uses a test operation constant of which the output value of said angular velocity estimator is small as compared with the command rotational angular velocity of the three-phase induction motor, in the case where a test operation is conducted with the laundry in the rotatable drum equal to a maximum tolerance mount in the washing machine.

25. The washing machine of claim 21, wherein the test operation controller test operates the three-phase induction motorby using a command value including the torque current component expressed at least as the product of the integration of the difference between the command rotational angular velocity of the three-phase induction motor and the output value of an angular velocity estimator by a predetermined test operation constant.

26. The washing machine of claim 25, wherein in the case where a test operation is conducted with the laundry of the maximum tolerance amount of the washing machine in the rotatable drum, the test operation controller selects such a test operation constant that the time length from the time point of start of the test operation to the time point when the output of said angular velocity estimator reaches a specified rotational angular velocity is longer than the time length in the case where the washing machine is operated without laundry.

27. The washing machine of claim 21, wherein the test operation controller conducts a test operation of said three-phase induction motor by commanding a predetermined torque current component value.

28. The washing machine of claim 20, wherein the controller comprises a motor constant measurement device for measuring at least one of the constants unique to the three-phase induction motor.

29. The washing machine of claim 28, wherein the motor constant measurement device measures at least one of the constants unique to the three-phase induction motor including the electrical resistance, the self-inductance, and the mutual inductance of the stator winding and the rotor winding at least one of the times of switching on power, supplying water and discharging water.

30. The washing machine of claim 20, wherein the controller comprises a resistance value compensator for correcting at least one of the electrical resistance value of the stator and the electrical resistance value of the rotor of the three-phase induction motor in accordance with the time when the three-phase induction motor is running.

31. The washing machine of claim 20, further comprising a torque constant operation controller for rotating the rotatable drum with the torque current component maintained at a constant value.

32. The washing machine of claim 20, further comprising an unbalanced amount estimator for estimating the unbalanced amount due to the uneven distribution of laundry closely attached to the inner surface of the rotatable drum based on the torque output of the motor.

33. The washing machine of claim 32, further comprising:
a plurality of tanks arranged in said rotatable drum and capable of storing water;
an unbalanced position estimator for estimating the position of laundry closely attached unevenly to the inner surface of said rotatable drum; and
an unbalanced amount corrector for reducing the unbalanced amount by draining the water prestored in the tanks based on the outputs of the unbalanced amount estimator and the unbalanced position estimator.

34. The washing machine of claim 20, further comprising protrusions mounted inside said rotatable drum, said laundry being liable to be caught by said protrusions when the washing machine is rotating in the direction of washing, said laundry being not liable to be caught by said protrusions when the washing machine is rotating in the direction of dewatering.

35. A method for controlling the operation of a washing machine, comprising:
measuring the rotational angular velocity of a three-phase induction motor based on at least one of the primary AC current and a primary AC voltage supplied to a stator of the three-phase induction motor and constants unique to the three-phase induction motor, the three-phase induction motor engaging a rotatable drum or an agitator in the rotatable drum; and altering a torque current component and an exciting current component of primary AC currents supplied to the stator of the three-phase induction motor in accordance with a command rotational angular velocity of the three-phase induction motor and the measured rotational angular velocity of the three-phase induction motor, whereby the magnitude and frequency of each of the primary AC currents is altered to control the rotational angular velocity of the three-phase induction motor.

36. The method of claim 35, wherein the altering step includes:
measuring each of primary AC currents supplied to the stator of the three-phase induction motor;
controlling the primary AC current so that the outputs of current detectors coincide with corresponding command currents, respectively, and
producing a command current for commanding the magnitude and frequency of each of the primary AC currents by commanding the torque current component and the exciting current component of the primary AC currents independently of one another.

37. The method of claim 35, further comprising:
conducting a test operation of the three-phase induction motor by commanding as said torque current component the product of the difference between the command rotational angular velocity of the three-phase induction motor and the output value of an angular velocity estimator by a predetermined test operation constant; and
estimating the amount of laundry based on the magnitude of the output of the angular velocity estimator during the test operation.

38. The method of claim 37, wherein the estimating step is based on a range of variation of the output value of the angular velocity estimator during the test operation.

39. The method of claim 37, wherein when the conducting step is performed with the laundry of the maximum tolerance amount of the washing machine in the rotatable drum, the method further comprises the step of selecting such a test operation constant that the time length from the time point of start of the test operation to the time point when the output of said angular velocity estimator reaches a specified rotational angular velocity is longer than the time length in the case where the washing machine is operated without laundry.

40. The method of claim 35, further comprising measuring at least one of the constants unique to the three-phase induction motor including the electrical resistance, the self-inductance, and the mutual inductance of the stator winding and the rotor winding at least one of the times of switching on power, supplying water and discharging water.

41. The method of claim 35, further comprising estimating an unbalanced amount due to the uneven distribution of laundry closely attached to the inner surface of the rotatable drum based on the torque output of the motor.

42. A washing machine, comprising:
three-phase induction driving means for driving a rotatable drum or an agitator mounted in the rotatable drum;
controlling means for independently controlling the torque current component and the exciting current component of primary AC currents supplied to the stator of the three-phase induction driving means in accordance with the command rotational angular velocity of said three-phase induction driving means and the rotational angular velocity of the three-phase induction driving means, thereby changing the magnitude and frequency of each of said primary AC currents thereby to control the rotational angular velocity of the three-phase induction driving means; and angular velocity estimation means for estimating the rotational angular velocity of the three-phase induction driving means based on at least one of the primary AC current and a primary AC voltage supplied to the stator of the three-phase induction driving means and constants unique to the three-phase induction driving means.

43. The washing machine of claim 42, wherein the controlling means includes:

measuring means for measuring each of primary AC currents supplied to the stator of the three-phase induction driving means;

controlling means for controlling the primary AC current so that the outputs of current detectors coincide with corresponding command currents, respectively, and producing means for producing a command current for commanding the magnitude and frequency of each of the primary AC currents by commanding the torque current component and the exciting current component of the primary AC currents independently of one another.

44. The washing machine of claim 42, further comprising:

conducting means for conducting a test operation of the three-phase induction driving means by commanding as said torque current component the product of the difference between the command rotational angular velocity of the three-phase induction driving means and the output value of an angular velocity estimation means by a predetermined test operation constant; and estimating means for estimating the amount of laundry based on the magnitude of the output of the angular velocity estimation means during the test operation.

45. The washing machine of claim 44, wherein the estimation is based on a range of variation of the output value of the angular velocity estimation means during the test operation.

46. The washing machine of claim 44, wherein when the test operation is performed with the laundry of the maximum tolerance amount of the washing machine in the rotatable drum, the washing machine further comprises selecting means for selecting such a test operation constant that the time length from the time point of start of the test operation to the time point when the output of said angular velocity estimation means reaches a specified rotational angular velocity is longer than the time length in the case where the washing machine is operated without laundry.

47. The washing machine of claim 42, further comprising measuring means for measuring at least one of the constants unique to the three-phase induction driving means including the electrical resistance, the self-inductance, and the mutual inductance of the stator winding and the rotor winding at least one of the times of switching on power, supplying water and discharging water.

48. The washing machine of claim 42, further comprising estimating means for estimating an unbalanced amount due to the uneven distribution of laundry closely attached to the inner surface of the rotatable drum based on the torque output of the driving means.

* * * * *